United States Patent
Voldsbekk

(10) Patent No.: US 11,027,806 B2
(45) Date of Patent: Jun. 8, 2021

(54) TOWED BODY WITH FOILED DEPRESSOR

(71) Applicant: PGS Geophysical AS, Oslo (NO)

(72) Inventor: Rune Sindre Voldsbekk, Drammen (NO)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 16/715,329

(22) Filed: Dec. 16, 2019

(65) Prior Publication Data

US 2020/0198744 A1 Jun. 25, 2020

Related U.S. Application Data

(60) Provisional application No. 62/784,062, filed on Dec. 21, 2018.

(51) Int. Cl.
*B63G 8/18* (2006.01)
*B63B 21/66* (2006.01)
*G01V 1/38* (2006.01)
*B63G 8/00* (2006.01)

(52) U.S. Cl.
CPC ............... *B63G 8/18* (2013.01); *B63B 21/66* (2013.01); *B63G 8/001* (2013.01); *G01V 1/3826* (2013.01); *B63B 2211/02* (2013.01)

(58) Field of Classification Search
CPC . B63G 8/00; B63G 8/001; B63G 8/14; B63G 8/18; B63G 8/39; B63B 21/00; B63B 21/56; B63B 21/66; B63B 35/44; B63H 19/00; B63H 19/02; B63H 25/00; B63H 25/08; G01V 1/3826
USPC ........................................ 114/244, 245, 253
See application file for complete search history.

(56) References Cited

U.S. PATENT DOCUMENTS

| | | | | |
|---|---|---|---|---|
| 1,395,924 | A | * | 11/1921 | Magoun ................. B63B 21/66 114/244 |
| 3,434,451 | A | | 3/1969 | Brainard, II |
| 3,703,876 | A | | 11/1972 | Michelsen |
| 3,760,761 | A | | 9/1973 | Umazume |
| 3,921,562 | A | | 11/1975 | Kelly |
| 5,532,975 | A | * | 7/1996 | Elholm ................ G01V 1/3826 114/244 |
| 6,088,296 | A | | 7/2000 | Seaman et al. |
| 8,100,078 | B2 | | 1/2012 | Storteig et al. |
| 9,151,859 | B2 | | 10/2015 | Martin |
| 9,211,940 | B2 | | 12/2015 | Richer De Forges |

(Continued)

FOREIGN PATENT DOCUMENTS

| | | |
|---|---|---|
| CN | 101726756 | 6/2010 |
| JP | S5551697 A | 4/1980 |

(Continued)

OTHER PUBLICATIONS

European Search Report in Appl. No. 19219000.7 dated May 14, 2020, 11 pages.

*Primary Examiner* — Lars A Olson

(57) ABSTRACT

Apparatus and methods are disclosed relating to a body towable behind a vessel in a body of water, an arm rotatably coupled to the body, and one or more foils disposed on the arm. The arm, when deployed, is configured to be free to rotate as the apparatus is towed through the body of water. The one or more foils are configured to generate lift as the apparatus is towed. Due to the free rotation of the arm, the foils impart tension force to the body and not torque forces.

23 Claims, 17 Drawing Sheets

(56) References Cited

U.S. PATENT DOCUMENTS

| | | |
|---|---|---|
| 9,791,582 B2 | 10/2017 | Martin |
| 9,897,713 B2 | 2/2018 | Vageskar et al. |
| 9,932,093 B2 | 4/2018 | Sudow et al. |
| 10,029,765 B2 | 7/2018 | Jourdan et al. |
| 2006/0176774 A1 | 8/2006 | Toennessen |
| 2009/0003129 A1 | 1/2009 | Stokkeland |
| 2012/0295499 A1 | 11/2012 | Hine |
| 2014/0196653 A1 | 7/2014 | Leschevin |
| 2017/0341714 A1 | 11/2017 | Barry et al. |
| 2018/0164459 A1 | 6/2018 | Mattsson et al. |
| 2018/0290716 A1 | 10/2018 | Nams et al. |

FOREIGN PATENT DOCUMENTS

| | | |
|---|---|---|
| JP | 2001058593 A | 3/2001 |
| NO | 142207 B | 4/1980 |

\* cited by examiner

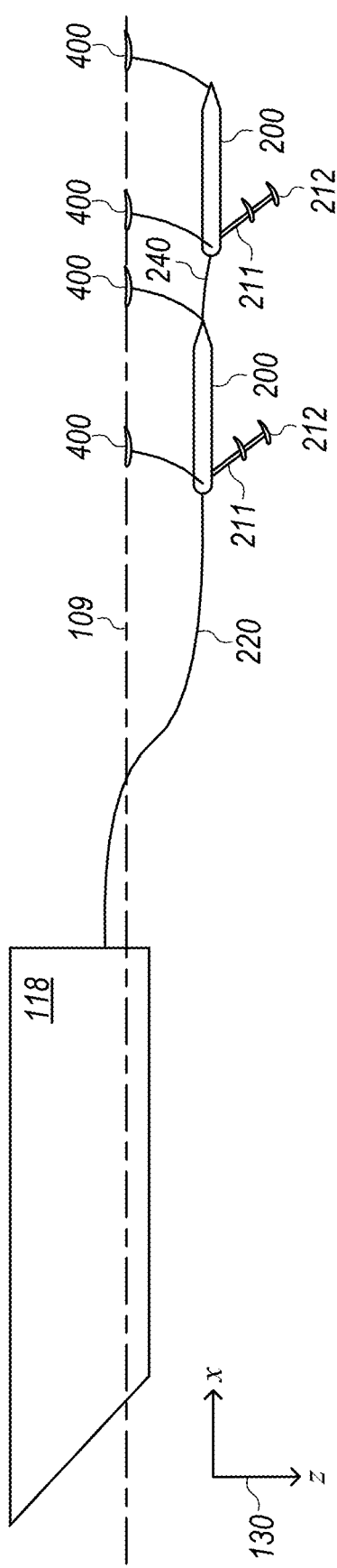
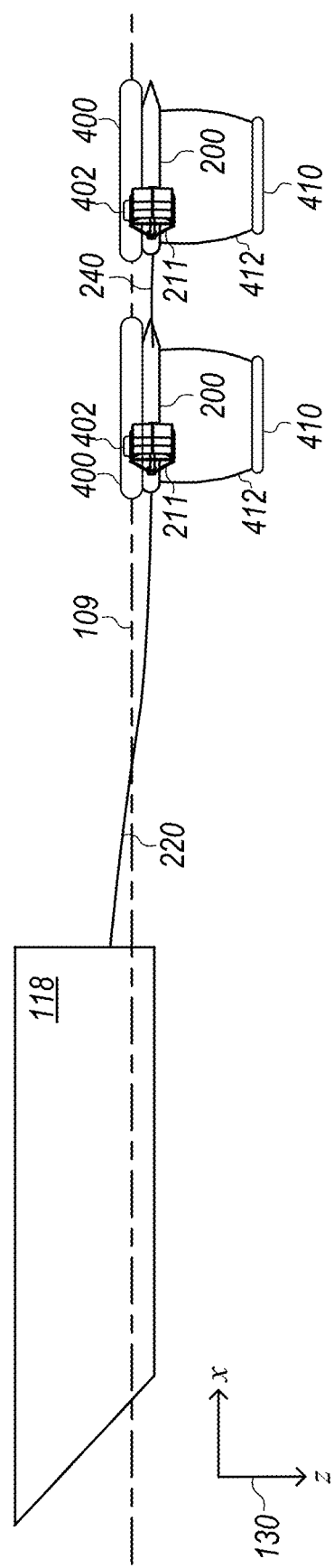

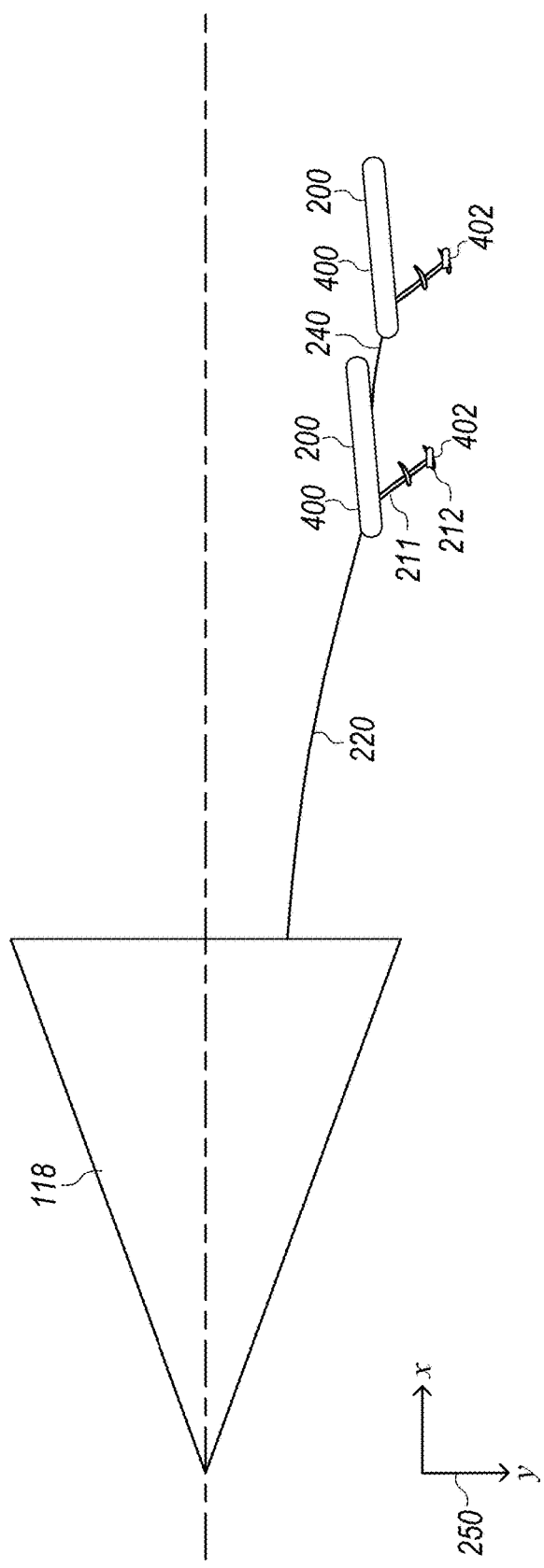
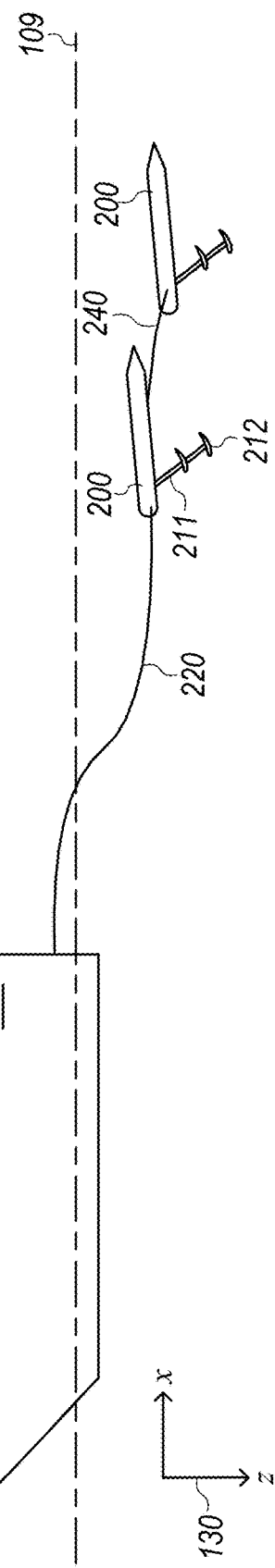

TOWED BODY WITH FOILED DEPRESSOR

CROSS-REFERENCE TO RELATED APPLICATIONS

This application claims benefit to the filing date of U.S. Prov. Appl. No. 62/784,062 entitled "Towed Body With A Multi-Foiled Depressor" filed on Dec. 21, 2018, which application is hereby incorporated by reference as if entirely set forth herein.

BACKGROUND

In the field of towing marine equipment, it is desirable to be able to control the depth and/or the lateral position of the towed equipment. Traditional techniques for doing so have presented a number of problems including increased drag and expense due to the nature of the structures that have been employed to produce lift forces in the water.

BRIEF DESCRIPTION OF THE DRAWINGS

FIG. 4A illustrates a side view of an example towed configuration with two towed bodies coupled to floats, with a proximal body coupled to the vessel by an umbilical and a distal body coupled to the proximal body by an umbilical, each with multi-foiled arms deployed in a vertical direction, in accordance with various embodiments.

FIGS. 4B and 4C illustrate side and top views, respectively of another example towed configuration with two towed bodies coupled to floats, with a proximal body coupled to the vessel by an umbilical and a distal body coupled to the proximal body by an umbilical, each with multi-foiled arms deployed in a horizontal direction, in accordance with various embodiments.

FIG. 5 illustrates a side view of another example towed configuration with two towed bodies, with the proximal body coupled to the vessel by an umbilical and the distal body coupled to the proximal body by an umbilical, each with multi-foiled arms deployed in a vertical direction, in accordance with various embodiments.

DETAILED DESCRIPTION

Figure 1:
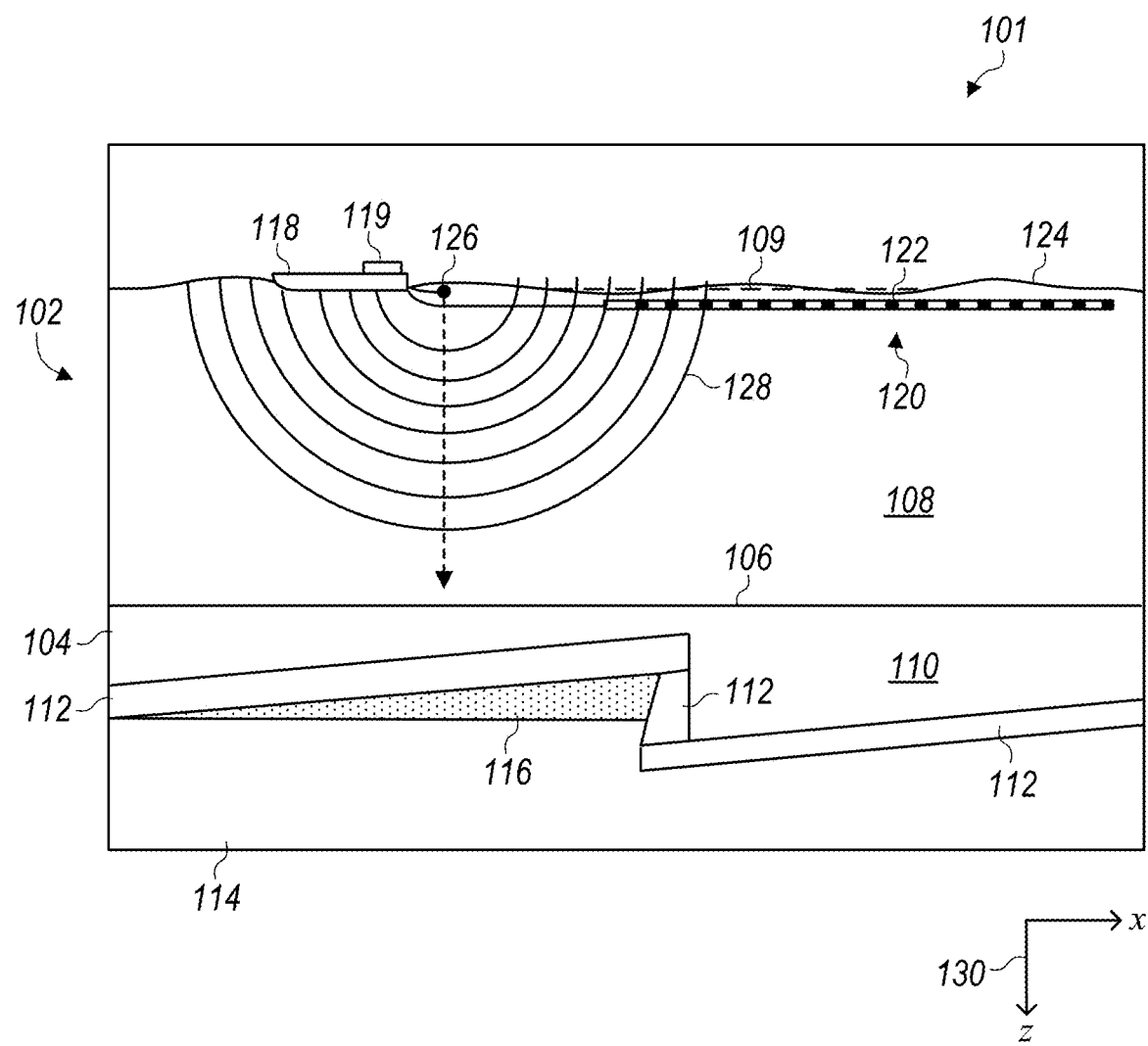
FIG. 1 is an elevation view of an example of marine survey in which signals are emitted by a seismic source for recording by marine survey receivers in accordance with various embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "bodies," "depressors," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "body configured to deploy a depressor" is intended to cover, for example, a device that performs this function during operation, even if the device in question is not currently being used (e.g., a power supply is not connected to it).

The term "configured to" is not intended to mean "configurable to." An unprogrammed field programmable gate array (FPGA), for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. However, some of the claims in this application as filed are intended to be interpreted as having means-plus-function elements. Should Applicant wish to invoke Section 112(f) during prosecution in these claims or any other claims, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" bodies would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

FIG. 1 illustrates an elevation or xz-plane 130 view of an example marine survey. FIG. 1 shows a domain volume 102 of the earth's surface comprising a subsurface volume 104 of sediment and rock below the surface 106 of the earth that, in turn, underlies a fluid volume 108 of water such as an ocean, an inlet or bay, or a large freshwater lake, having a surface 109. FIG. 1 further illustrates a first sediment layer 110, an uplifted rock layer 112, a second, underlying rock layer 114, and hydrocarbon-saturated layer 116. Marine survey vessel 118 can tow one or more streamers 120 (shown as one streamer for ease of illustration) and one or more sources 126 (in seismic surveys, typically air guns or marine vibrators), generally located below the sea surface 109. The streamers 120 can be long cables containing power and data-transmission lines (e.g., electrical, optical fiber, etc.) along which marine survey receivers 122 may be disposed. Receivers 122 may include any of various known geophysical sensors or a mix thereof. For example, each of receivers 122 may comprise one or a pair of sensors including a geophone that detects particle motion (e.g. by detecting velocities or accelerations), and/or a hydrophone that detects variations in pressure. In other types of marine surveys, one or more of marine survey receivers 122 may comprise an electromagnetic receiver that detects electromagnetic energy within the water. In the latter types of surveys, one or more of sources 126 may comprise an electromagnetic source. The streamers 120 and the marine survey vessel 118 can include sensing electronics and data-processing facilities that allow marine survey receiver readings to be correlated with absolute positions on the sea surface and absolute three-dimensional positions with respect to a three-dimensional coordinate system and recorded.

Seismic sources 126 and/or streamers 120 may also be towed by other vessels, or may be otherwise disposed in fluid volume 108. For example, marine survey receivers may be located on ocean bottom cables or nodes fixed at or near the surface 106, and seismic sources 126 may also be disposed in a nearly-fixed or fixed configuration. For the sake of efficiency, illustrations and descriptions herein show marine survey receivers located on streamers, but it should be understood that references to marine survey receivers located on a "streamer" or "cable" should be read to refer equally to marine survey receivers located on a towed streamer, an ocean bottom receiver cable, and/or an array of nodes. Although illustrated as a point, the seismic source 126 can represent a source string or a source array. The marine survey vessel 118 may also include a controller 119. For example, controller 119 can be coupled to the seismic source 126 and configured to control its activation and/or its deployment and recovery, as well as to perform navigation and data recording functions as necessary or desirable.

FIG. 1 shows source energy illustrated as an expanding, spherical signal, illustrated as semicircles of increasing radius centered at the seismic source 126, representing a down-going wavefield 128, following a signal emitted by the seismic source 126. The down-going wavefield 128 is, in effect, shown in a vertical plane cross section in FIG. 1. The outward and downward expanding down-going wavefield 128 may eventually reach the surface 106, at which point the outward and downward expanding down-going wavefield 128 may partially scatter, may partially reflect back toward the streamers 120, and may partially refract downward into the subsurface volume 104, becoming elastic signals within the subsurface volume 104.

In geophysical operations, there is a need to control the positions (e.g. depth and/or lateral positions) of any or all of the above-described equipment as it is towed. Embodiments of the present disclosure beneficially address this need. Accordingly, the remaining Figures and description depict and describe various example embodiments of bodies with foiled depressors that are capable of imparting forces on the bodies to help control the depth and/or lateral positions of the bodies during tow. The embodiments shown and described are not intended to limit the present disclosure to only those embodiments. Rather, they illustrate different features for the purpose of explaining how the various features can be utilized with beneficial effect, independently or in a variety of combinations, by persons having skill in the art and having reference to this disclosure.

Example Towed Bodies With Foiled Depressors

Figure 2A:
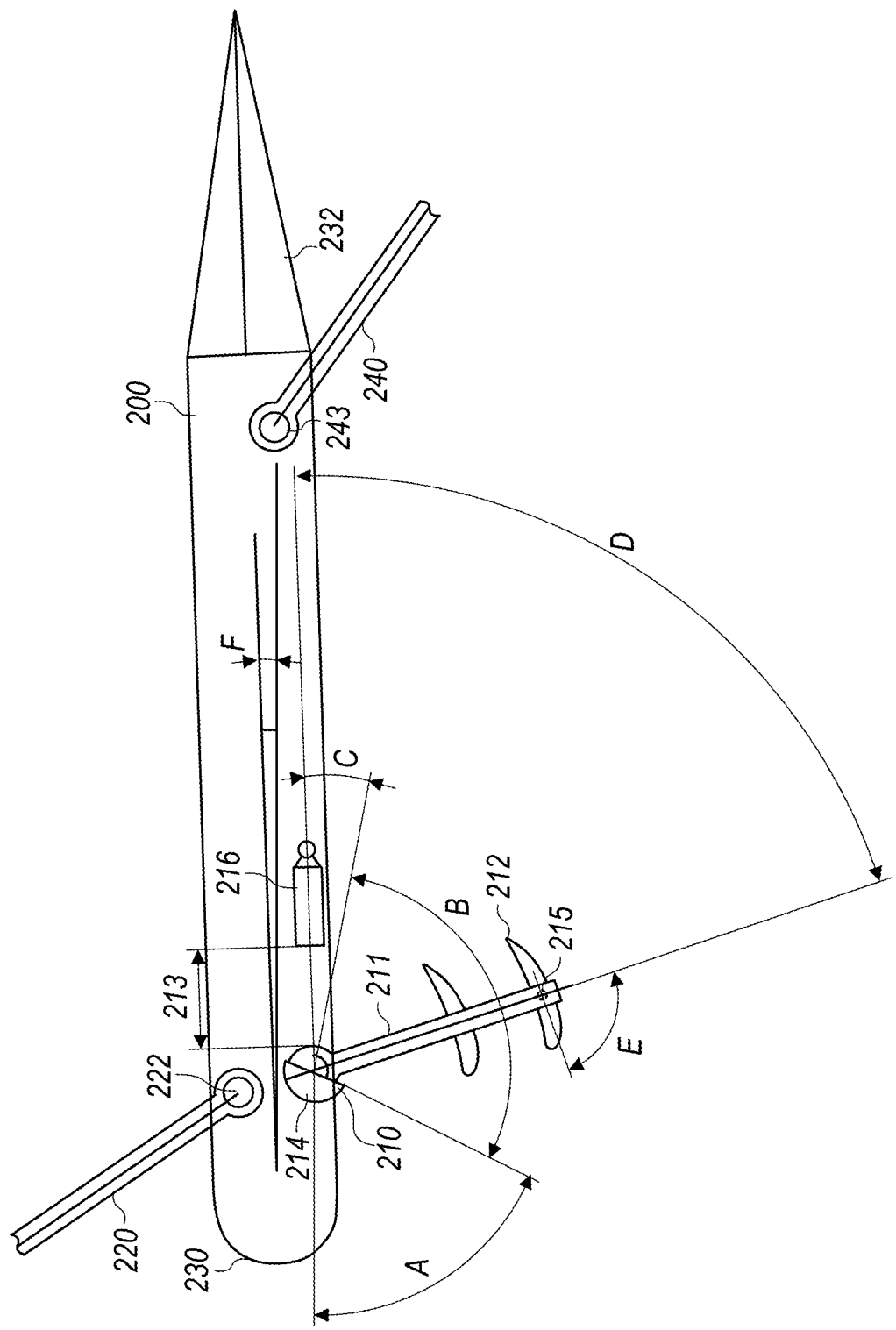
FIG. 2A illustrates a first example towed body and umbilical with a foiled arm in a deployed position in accordance with various embodiments.
Figure 2B:
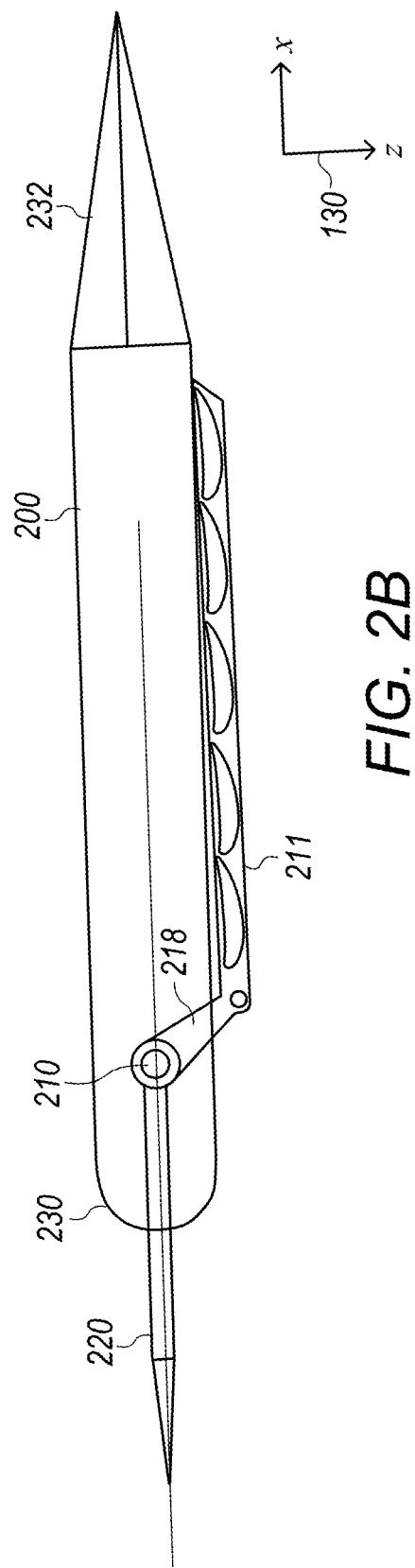
FIG. 2B illustrates a second example towed body and umbilical with a foiled arm in a stowed position in accordance with various embodiments.
Figure 2C:
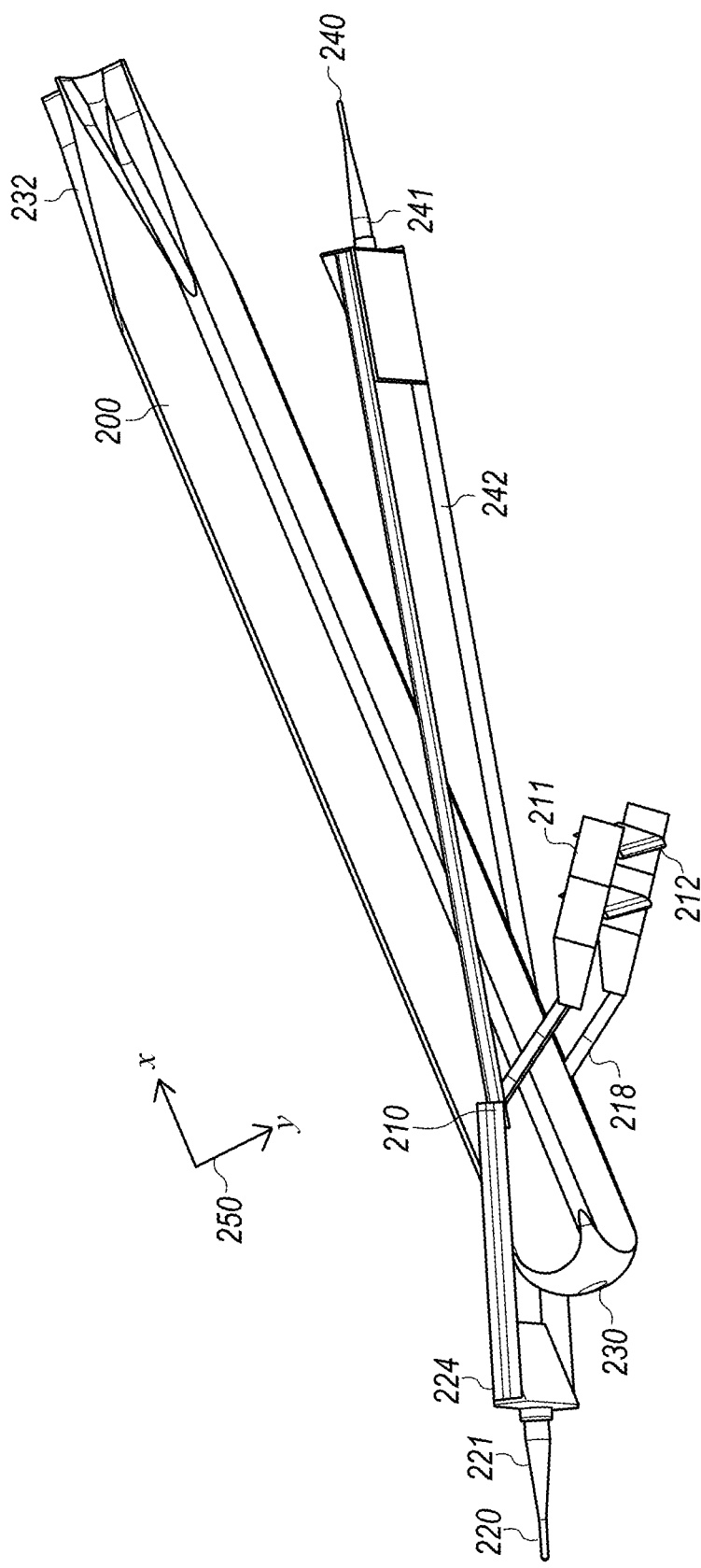
FIG. 2C is an oblique view of a third example towed body and umbilical with a foiled arm in a deployed position in accordance with various embodiments.

FIGS. 2A-C schematically illustrate a number of such features. FIG. 2A depicts a side view of an example embodiment of a body 200 with a depressor arm 211 in a deployed position. FIG. 2B depicts a side view of another example embodiment of a body 200 with a depressor arm 211 in a stowed position. FIG. 2C depicts an oblique view of yet another example embodiment of a body 200 with arm 211 in a deployed position.

In the embodiment of FIG. 2A, depressor arm 211 is shown with two attached foils 212 and is connected to body 200 at rotary coupling 210 near a front end 230 of body 200. An umbilical 220 is connected to body 200 at another rotary coupling 222, also near front end 230 but offset from rotary coupling 210. Umbilical 220 may be used to couple towed body 200 to a vessel or towing harness, for example, or to another towed body 200. Another umbilical 240 is shown connected to body 200 at rotary coupling 243 near tail end 232 of body 200. Umbilical 240 may be coupled, for example, to another towed body 200 or other equipment. In the embodiment shown, depressor arm 211 may rotate freely about rotary coupling 210 along angle B subject to limits imposed by end stops 214 and 216. In general, rotatable couplings 210, 222, 243 may vary in their implementations. For example, in some embodiments, they may be implemented as rods, tubes, shafts, or the like inserted into body 200 at the desired rotation point. But in other embodiments rotary couplings may be any rotary bearing that permits rotational movement of an arm 211 or umbilical or associated structure about a pivot point.

In various embodiments, end stops 214 and 216 define a range of free rotation of depressor arm 211 when the arm is deployed. In the embodiment shown in FIG. 2A, end stops 214 and 216 restrict the rotation of arm 211 about the pivot point defined by rotary coupling 210. For example, end stops 214 and/or 216 may be rigid or semi-rigid plates or pins that wrap around rotary coupling 210 or insert into receptacles in rotary coupling 210 to impinge against arm 211 as it rotates about the pivot point. In other embodiments, end stops 214 and/or 216 may be brackets that rotate about and/or slide along a linear member such as a tube, as will be further discussed below with reference to FIG. 11. In various embodiments, one or more motors may be adapted to adjust the range of rotation of arm 211 about the pivot point by adjusting a position of one or more end stops 214, 216 (e.g., by inserting a pin, or moving a pin from one receptacle to another, or by rotating a plate about rotary coupling 210). In various embodiments, such a motor may be a screw drive configured to move an end stop 214, 216 along the longitudinal axis of body 200 as shown at 213.

In various embodiments, the stowed position and one or more deployed positions are defined by the various angles of arm 211 relative to body 200. As shown in FIG. 2A, angle A is the angle between body 200 and the rotation limit imposed on arm 211 by end stop 214. Angle B is the zone of free rotation of arm 211 about rotary coupling 210 as defined by end stops 214 and 216. Angle C is the angle between body 200 and the rotation limit imposed on arm 211 by end stop 216. Angle D is the angle between body 200 and arm 211 when arm 211 is in an intermediate deployed position. In the embodiment shown in FIG. 2A, Angle B is about 90 degrees and Angle D is about 80 degrees. These angles are approximations, and various other angles can be used in various embodiments. Angle F is the angle between a midline of body 200 and a direction of water flow across body 200 in one example contemplated towing orientation. In the embodiment shown in FIG. 2A, arm 211 is in a first deployed state, and body 200 is oriented along a first line parallel to a direction of travel of the marine survey vessel 118. By adjusting the position(s) of end stop 214 and/or end stop 216, Angles A, B, C, and D may be adjusted such that the deployment state of depressor arm 211 is adjusted. For example, in various embodiments, if Angle A is increased to 170 degrees or more, for example, depressor arm 211 will be in a stowed state as shown in FIG. 2B. Further, if Angle A is decreased and Angle C is increased, then arm 211 is free to rotate within a different range in a second deployed position. Thus, in various embodiments (a) when an end stop 214 and/or 216 is disposed at a first position, arm 211 is in a stowed state, (b) when an end stop 214 and/or 216 is disposed at a second position, arm 211 is in a first deployed state in which a position of the arm 211 relative to the body 200 defines a first angle D, and (c) when an end stop 214 and/or 216 is disposed at a third position, arm 211 is in a second deployed state in which the position of the arm 211 relative to the body 200 defines a second, different angle D. In various instances, when angle D is changed, angle F may also change when body 200 is in equilibrium. For example, when depressor arm 211 is in a first deployed state, angle F is zero or near zero such that body 200 is oriented along the direction flow across body 200. When depressor arm 211 is in a second deployed state, however, angle F increases such that body 200 is oriented diagonally relative to the direction of flow in various embodiments. As used herein, the various embodiments of depressor arms and rotary couplings, and their corresponding structural equivalents, may be referred to as a "second means for coupling the first means to the body."

In various embodiments, the multiple foils 212 of depressor arm 211 can have similar profiles and angles of attack relative to the water flow. Allowing arm 211 to swing freely enables the transfer of tension forces through the arm 211 to body 200 while avoiding the transfer or torque forces to body 200 (provided that arm 211 is between its limits of rotation). Depressor arm 211 may be configured to urge body 200 in a particular direction by exerting tension force on rotary coupling 210 such as, for example, pulling coupling 210 in a direction orthogonal to the angle of attack of foils 212 (i.e., tension resulting from lift). As will be discussed further below in relation to other example embodiments, such forces can be applied vertically (e.g., along the z axis of xz plane 130) and/or laterally (e.g., along the y axis of xy plane 250 shown in FIG. 3). In various embodiments, depressor arm 211 can be moved (e.g., stowed) when lift is not wanted. For example, depressor arm 211 can be retracted close to or inside body 200 (see, e.g., FIG. 2B). Retracting depressor arm 211 can make operations with body 200, such as deployment, retrieval, or storage, easier (see, e.g., FIG. 7).

As discussed herein, "lift" refers to the force generated as a result of the foils 212 being moved through the body of water. The direction of lift is orthogonal to the angle of attack of foils 212. In various embodiments, lift puts tension on arm 211, which in turns pulls body 200 in the direct of the lift. Such lift can be oriented in any direction including along either or both of they axis or z axis discussed herein according to the position of depressor arm 211 about body 200 and relative to the direction of travel of marine survey vessel 118.

In the various embodiments, the lift force that the depressor generates is carried by one or more arms 211 that are rigid tension members. Because it is rigid (as opposed to a flexible cable for example), arm 211 can be controlled to be deployed or stowed as discussed herein, and desirable forces resulting from lift on foils 212 can be transferred by arm 211 to body 211. If depressor arm 211 did not have a zone of free rotation, however, then some part of the structure of depressor arm 211 would have to carry loads other than in tension, and would be subject to some as bending moments. In such a case, as the surface area of foils 212 becomes larger, so would the structure required of arm 211 to carry the resulting forces. Due to leverage, the strength of arm 211 would decline as the length of arm 211 is extended to include multiple sets of foils 212. Accordingly, by granting arm 211 a zone of free rotation in the deployed position, multiple foils 212 can be added to the depressor without compromising the integrity of arm 211.

In various embodiments, the angles of attack of the foils 212 relative to arm 211 may be adjustable, either individually or together in one or more groups (as indicated generally by arc E in FIG. 2A). Such adjustments may be made, for example, with motors (e.g., electric motors) or hydraulics disposed in arm 211 that are configured to rate foils 212 relative to arms 211. The angle of attack of foils 212 can be set to any of a number of positions depending on the circumstances. For example, when depressor arm 211 is deployed, adjusting the angle of attack of one or more foils can increase or decrease lift. Thus, adjusting the angle of attack can adjust the strength of forces from foils 212 on body 200 by adjusting the angle (e.g., angle E shown in FIG. 2A) of foils 212 to arm 211 as it is towed. Accordingly, foils 212 can be set to different angles relative to the arm 211 whereby the combined lift to drag (L/D) ratio of the foils 212 is changed, causing a change in a force applied to body 200. In yet other embodiments, setting an angle of the foils 212 can be done manually before or after a towing operation, or in steps or continuously via remote or automatic control in various embodiments. The foils 212 can be set to different angles relative to the arm such that the combined volume or shape of the foils is changed. It may also be beneficial to rotate foils 212 along their axes 215 as arm 211 is moved into its stowed position, so that foils 212 will lie flat and generally parallel with one another (see, for example, FIG. 2B).

In various embodiments, any number of foils 212 may be present, including but not limited to one foil 212, two foils 212, three foils 212, four foils 212 or more. Moreover, in various embodiments, the profiles of foils 212 may differ. The cross-sectional profiles of foils may be flat or may exhibit an air foil or tear drop shape, and may be curved or straight depending on the intended application. Similarly, the longitudinal shape of foils 212 may differ. In some embodiments, the foils may be generally straight (linear), or may exhibit a curve or v shape from one end to the other. In various embodiments, a v-shaped or curved shape may have the effect of creating a smaller specific load on the accompanying structure of arm 211, as these shapes may transfer more desirable tension force and less undesirable bending force to arm 211. This, in turn, may enable lighter, thinner structure and higher hydrodynamic efficiency in various embodiments. As used herein, each of the various arrangements of foils 212 with various numbers of foils 212 and various sets of foils 212, along with their corresponding structural equivalents, may be referred to as a "first means for generating lift as the apparatus is towed through water."

In various instances, generating appropriate lift forces for depressed towed bodies 200 may be used to reduce overall towing drag, reduce fuel consumption, and enable a single marine survey vessel 118 to tow more equipment, thereby increasing the efficiency of the towing. In various embodiments, generating more lift with depressed towed bodies 200 can be used, for example, to tow the bodies at a larger deviation from vessel trajectory in a vertical direction (e.g., deeper in the body of water), a lateral direction (e.g., increasing the spread of towed bodies), or combinations thereof. In various embodiments, generating more lift with depressed bodies 200 can be used to provide more flexibility during surveying by avoiding the need to couple the bodies 200 to other equipment or to dispose them at fixed depths or lateral positions.

FIG. 2B depicts an embodiment with a depressor arm 211 in a stowed position. In the embodiment of FIG. 2B, arm 211 has five foils attached, and rotary coupling 210 is located at a center axis of body 200 (which is different from the location of coupling 210 in the embodiment of FIG. 2A) to demonstrate that the location of the rotary couplings may be varied as desired in various applications. Because of the location for coupling 210 in the embodiment of FIG. 2B, depressor arm 211 connects to coupling 210 via an extension member 218, in order to accommodate the movement of arm 211 to its illustrated stowed position. Another difference between the embodiments of FIGS. 2A and 2B is that umbilical 220 is connected to body 200 at rotary coupling 210 in the embodiment of FIG. 2B, to illustrate that the location of the umbilical connection may also vary depending on the application. Yet another difference is that the embodiment of FIG. 2B does not include a coupling 241 to accommodate an additional umbilical 240, but may be so equipped if desired. The embodiment of FIG. 2B is shown such that the lift force generated by depressor arm 211 on body 200 will be in the z or depth direction, as the arm 211 in this embodiment will rotate in the xz plane 130 when deployed.

When depressor arm 211 is in a stowed position, the arm 211 is relatively immobilized relative to body 200, and foils 212 are configured to generate no lift (or relatively little lift compared to a deployed position). As will be further discussed below, arm 11 may be placed in a stowed position when body 200 is stowed on and deployed from vessel 118. Arm 211 may also be configured to be in the stowed position when body 200 is in the body of water until the components of body 200 (e.g., one or more motors) cause arm 11 to move from the stowed position to a deployed position. The angle of attack of foils 212 may be changed in order to assist movement of arm 211 from its stowed position to a deployed position, and similarly when it is desired to move arm 211 from a deployed position back to its stowed position. In various instances, deploying and/or stowing the arm 211 may include moving arm 211 directly with a driving mechanism such as a motor, adjusting angles of attack of foils 212 and thus moving arm 211 with the help of hydrodynamic forces, or a combination of both. (From a certain stroke/angle, the free rotation or zone of balance between arm angle and hydrodynamic forces goes into action for further rotation in various embodiments. Thus, hydrodynamic forces may be used to drive arm 11 toward body 200, i.e. decreasing Angle D, and then a driving mechanism may act directly on arm 211 to achieve the stowed position in various embodiments.)

FIG. 2C illustrates an embodiment that is oriented such that its arm 211 will rotate in the xy plane 250 when deployed, so that lift forces generated will tend to move body 200 in a lateral direction rather than in the depth direction. Any of the embodiments described herein may be oriented in any direction as appropriate given the desired application and the desired direction of lift forces. For example, lift generated by the foils 212 can be directed along the y axis (e.g., a port-starboard axis relative to the direction of travel of marine survey vessel) and/or along the z axis (e.g., a vertical axis extending downward from the surface of the body of water as shown in FIG. 1), or an arbitrary intermediate angle depending on the orientation of the device in the yz plane.

The embodiment of FIG. 2C also illustrates another manner in which umbilicals may be connected to a body 200. In the embodiment of FIG. 2C, a front umbilical frame 224 is provided, rotatably coupled to body 200 at coupling 210. Front umbilical 220 is connected to frame 224 by a termination 221. Similarly, a tail umbilical frame 242 is provided, also rotatably coupled to body 200 at coupling 210. Rear umbilical 240 is connected to frame 242 by a termination 241. Terminations 221, 241 may be constructed according to a variety of known techniques for coupling cables to marine structures and may include steel housings in some embodiments. In the illustrated embodiment, the length of frame 242 is selected such that it will contact the side of body 200 when aligned with the tow direction of body 200. In other embodiments, it may be desirable to select a longer length for frame 242 to allow clearance between the end of frame 242 and the tail 232 of body 200 during tow. (As the illustrated embodiment demonstrates, the orientation of body 200 may vary during tow.) In the embodiment of FIG. 2C, front umbilical 220 may be used to couple body 200 to a vessel or to another body 200 or another piece of equipment. Likewise, umbilical 240 may be connected to another tow body 200 or to other pieces of equipment. In general, umbilicals 220 and 240 may comprise any suitable tow member, but typically may comprise cables containing a strength member and possibly power and/or data-transmission or control lines (e.g., electrical, optical fiber, etc.). Bodies 200 may receive not only power via umbilicals 220, 240 but may also communicate with one another and with components on vessel 118 or other equipment via umbilicals 220, 240.

Example Applications of Towed Bodies With Foiled Depressors

In some applications, body 200 may be coupled to and towed by vessel 118 using umbilical 220, while body 200 is also coupled to other objects being towed by umbilical 240. These other objects may include additional bodies 200 or various other equipment, including one or more streamers 120. For example, a first body 200 proximate to vessel 118 may be configured to be, or to house, a seismic source 126, and a second, distal body 200 may be configured to be, or to house, one or more marine survey receivers 122. In various other embodiments, vessel 118 may tow a first body 200 configured to be a seismic source 126, which body in turn tows a streamer 120.

Referring now to FIGS. 3-8, various applications of towed bodies 200 with depressors 211 are shown according to various embodiments. Although most of the examples shown in FIGS. 3-8 depict the use of multiple bodies being towed in daisy chain fashion or in a stacked arrangement, each of the illustrated techniques may also be employed with a single towed body 200.

Figure 3:
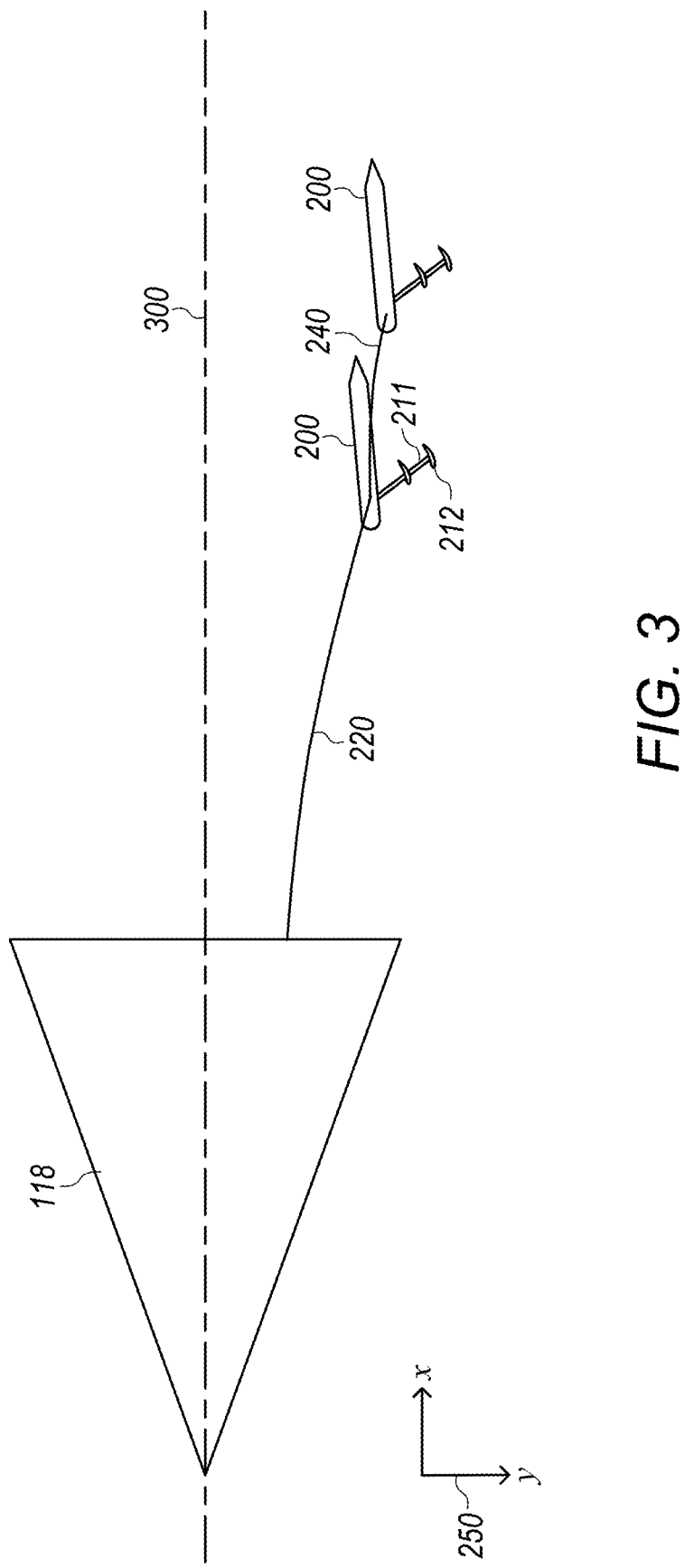
FIG. 3 illustrates a top view of an example towed configuration with two towed bodies, each with multi-foiled arms in accordance with various embodiments.

FIG. 3, is a top view of an example towing configuration with two bodies 200, each with depressor arms 211 having multiple foils 212. The proximal body 200 (nearest vessel 118) is connected to vessel 118 by umbilical 220. A second umbilical 240 is connected between the proximal body 200 and the distal body 200 such that the distal body 200 can exert force on the proximal body 200, and vice versa. The illustration depicts umbilicals 240 and 220 as being connected to the proximal body 200 at the same point or at points that are close to one another (as they could be, for example, in embodiments according to FIG. 2C). In other embodiments, however, the umbilicals may be connected to proximal body 200 at other locations. As non-limiting examples, umbilicals may alternatively be connected to a body 200 directly at its front end 230 and/or its tail end 232, or at locations according to FIG. 2A.

In the embodiment of FIG. 3, the depressor arms 211 are oriented such that at least a portion of the lift is directed along the y axis of xy plane 250. Thus, arm 211 and foils 212 of the proximal body 200 and arm 211 and foils 212 of the distal body 200 generate lift along y axis, or in a lateral or cross-line direction, resulting in lateral spread of the two bodies 200 relative to the centerline position 300 of marine survey vessel 118.

FIG. 4A is a side view illustrating an example towing configuration wherein a proximal body 200 (nearest vessel 118) is connected to vessel 118 by umbilical 220, a second umbilical 240 is connected between the proximal body 200 and a distal body 200, and each of the bodies 200 is coupled to one or more floats 400 (e.g. by cables, ropes, chains, etc.). As shown in FIG. 4, the bodies 200 are submerged under the body of water, while floats 400 remain at the surface. Depressor arms 211 are oriented such that at least a portion of the lift is directed away from the surface of the body of water along a vertical axis or a depth direction (i.e., the z axis of plane 130), thus resulting in tension on the lines coupled to floats 400 and/or adjustment of vertical position of bodies 200. In this manner, a desired depth may be maintained for each of bodies 200 by virtue of the length of the lines connecting them to their respective floats 400. Moreover, in various other embodiments, the depressor arms 211 may be oriented such that at least a portion of the lift is also directed along the y axis of xy plane 250, thus resulting in spread of the two bodies 200 relative to a centerline or position of marine survey vessel 118. In some embodiments, a first portion of generated lift may be directed along a vertical axis and a second portion of generated lift may be directed along a y axis.

FIGS. 4B and 4C are side and top views, respectively, of a towing configuration in which each of bodies 200 is coupled directly to a float 400, and marine equipment 410 is suspended below bodies 200 by any suitable connector (e.g. by cables, ropes, chains or by rigid structures, depending on the application and the type of marine equipment 410). In various applications, for example, marine equipment 410 is configured to be, or to house, one or more marine survey receivers 122 and/or one or more seismic source 126. In the application shown, each body 200 includes a depressor arm 211 that is oriented to provide lift in a lateral, or y axis, direction. In some embodiments, an additional float 402 may be attached to each depressor arm 211 to aid in maintaining a desired, level orientation of bodies 200 and arms 211 in the water.

FIG. 5 is a side view illustrating a towing configuration in which each of towed bodies 200 is submerged and is not coupled to a float. In this configuration, depressor arms 211 are oriented to provide lift force in the z-axis or depth direction. Because neither body 200 is coupled to a float at the surface, the entire apparatus is configured to be completely submerged in the body of water during towing (except for a portion of umbilical 220 that may be disposed above the surface of the body of water). In such embodiments, the vertical position of the bodies 200 is controlled in part by the amount of lift that is directed away from the surface of the body of water along a vertical axis (i.e., the z axis of plane 130). In various embodiments, the depth of such bodies 200 can be adjusted by adjusting the angle of rotation of arms 211, by adjusting the angle of attack of foils 212, and/or by adjusting the velocity at which marine survey vessel 118 tows the bodies 200 through the body of water.

Figure 6:
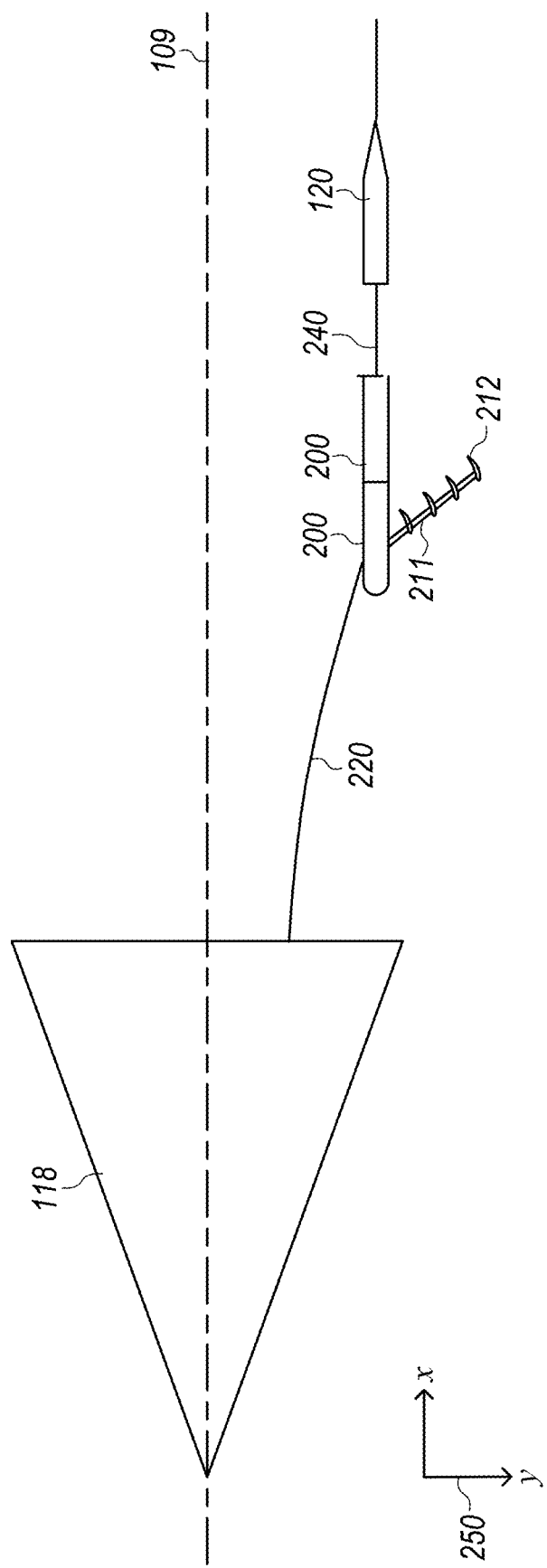
FIG. 6 illustrates a top view of an example towed configuration of stacked bodies and a multi-foiled arm working over the stacked bodies together, with an additional distal body coupled to the stacked bodies by an umbilical, in accordance with various embodiments.

FIG. 6 is a top view illustrating a towing configuration in which multiple bodies 200 are stacked end-to-end (e.g., connected in series with rigid or semi rigid couplers, hinged together, or otherwise coupled). In this configuration, a single multi-foiled depressor arm 211 may work over several of the stacked bodies 200 together, as shown. In addition, additional marine equipment may be towed behind the stacked bodies 200, such as a streamer 120 connected to the distal body 200. In some embodiments, either or both of bodies 200 can include one or more seismic sources 126.

Figure 7:
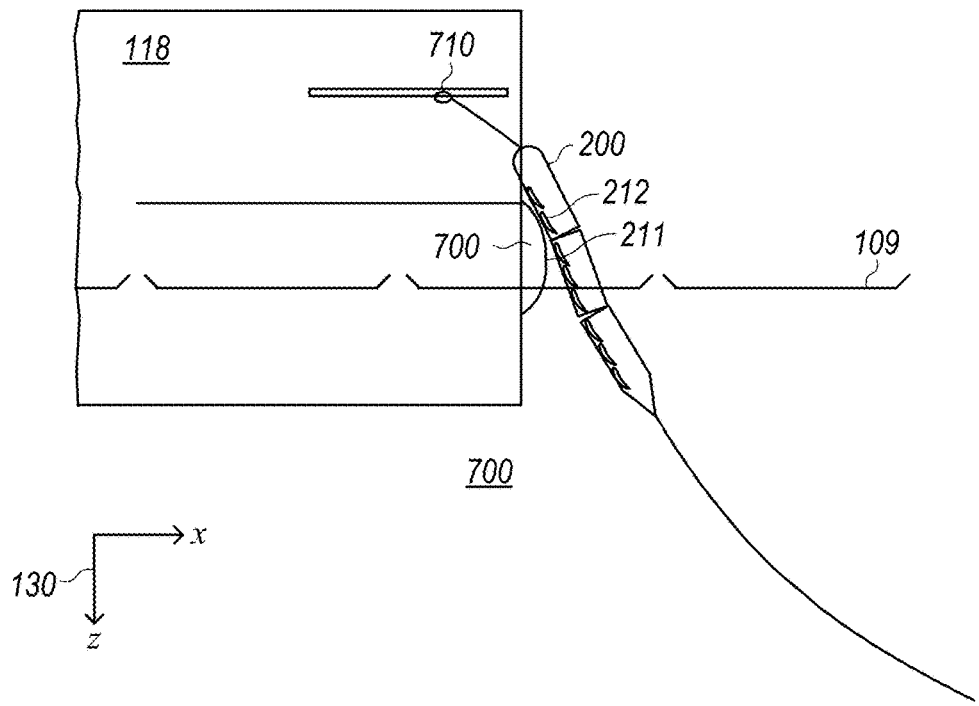
FIG. 7 illustrates a side view of an example configuration of bodies during deployment or retrieval over a curved slipway on a vessel in accordance with various embodiments.

FIG. 7 is a side view schematically illustrating an example technique for deploying and retrieving towed bodies according to any of the embodiments described herein. Vessel 118 may be equipped with a curved slipway 700, over which bodies 200 may slip during the deployment or retrieval process. In the embodiment shown in FIG. 7, the bodies 200 are hinged together to facilitate compliance as the bodies traverse slipway 700. Depressor arms 211 of the bodies 200 are shown in their stowed positions, and foils 212 are shown rotated such that they lie flat, also to facilitate the movement of bodies 200 over slipway 700 without damage or undue resistance. A winch 710 or other suitable driver may be used to accomplish the deployment and retrieval.

Figure 8:
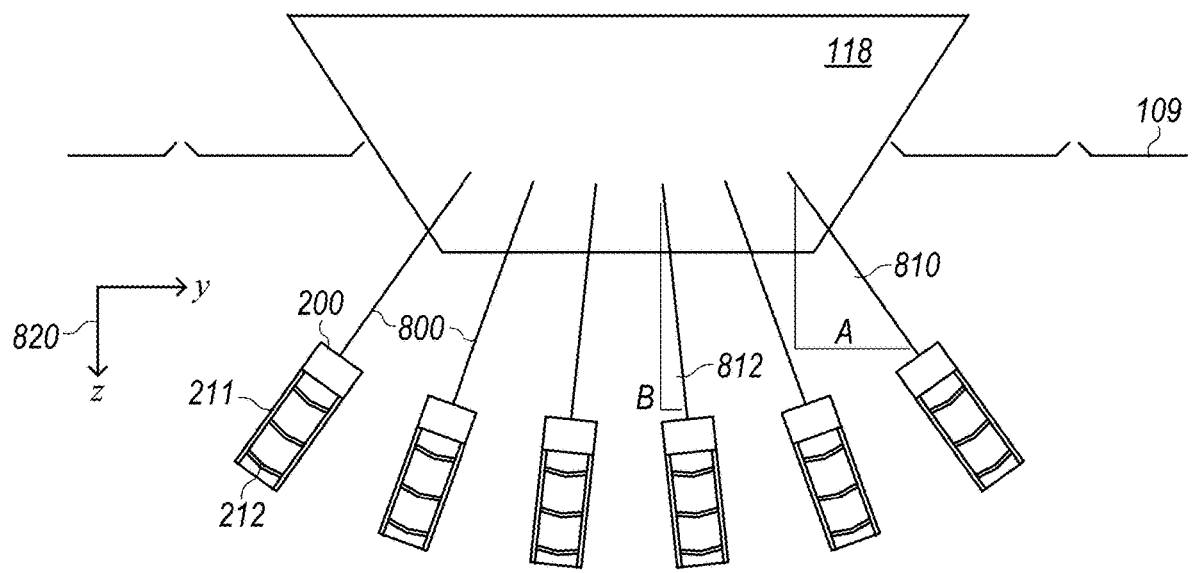
FIG. 8 illustrates a rear view of an example configuration of several bodies towed at different angles, with multi-foiled arms in deployed positions, in accordance with various embodiments.

Referring now to FIG. 8, a diagram illustrating a rear view along yz plane 820 of an example towed configuration of several bodies 200 with multi-foiled depressor arms 211 in deployed positions is shown. FIG. 8 shows the rear of bodies 200, with arms 211 extending downward from bodies 200 such that the trailing edge of the foils 212 is visible. In various embodiments, bodies 200 can be controlled to different X, Y, and Z positions (and combinations thereof) individually by adjusting the range of rotation of depressor arms 211 and/or by adjusting angles of attack of foils 212. In various embodiments, bodies 200 can be deployed and retrieved separately. In the embodiment shown in FIG. 8, each foil has an inverted "V" shape when viewed from the leading or trailing edge of the foil 212. The various bodies 200 are spread out behind marine survey vessel 118 in different orientations. For example, the right-most body 200 shown in FIG. 8 (indicated at A) is towed at a larger crossline offset than the bodies 200 that are towed closer to the middle of the array (as indicated, for example, at B). As a result, the foils 212 of the middle body 200 generate less crossline lift (lift along the y-axis) than do the foils of right-most body 200.

Additional Example Embodiments

Figure 9:
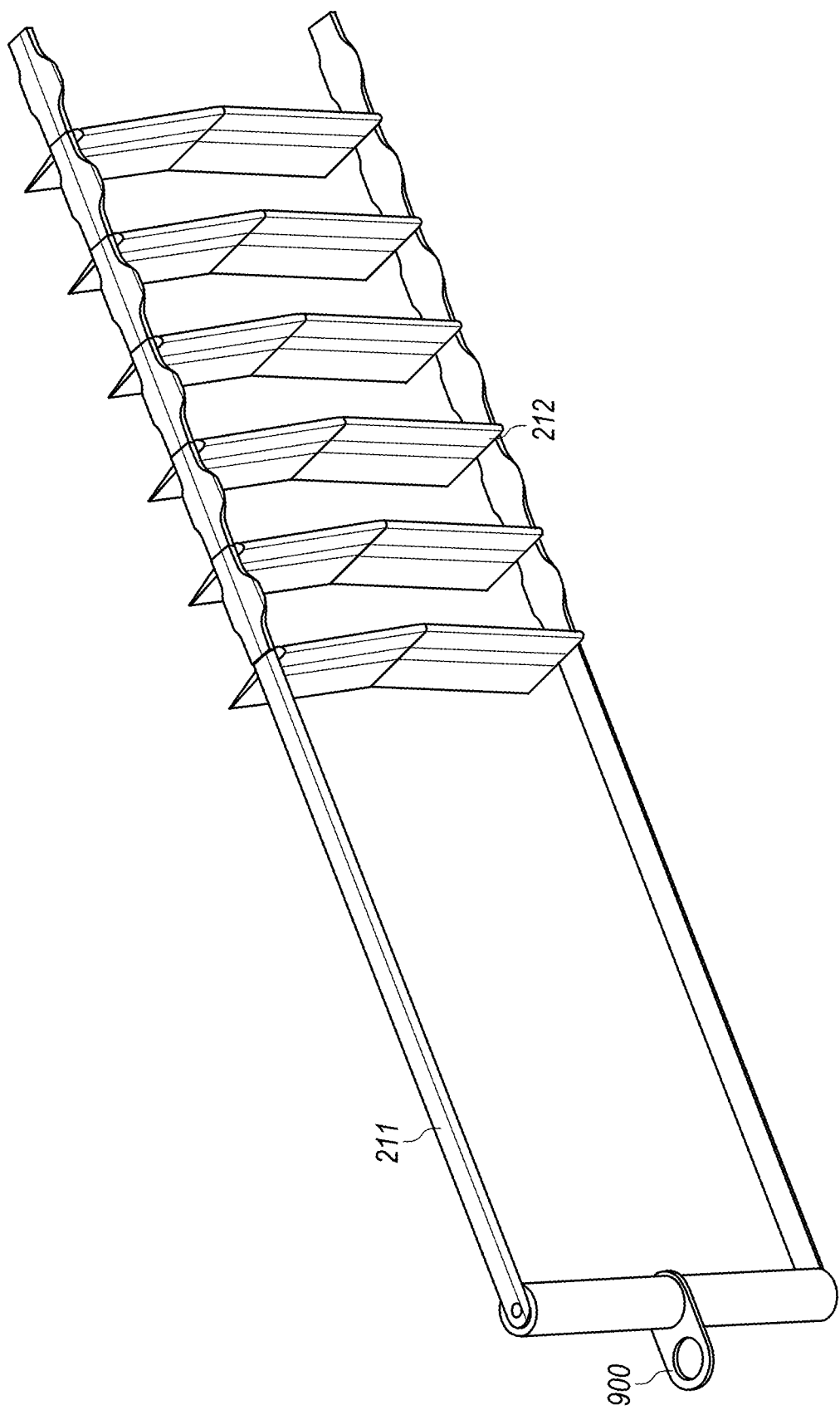
FIG. 9 illustrates an oblique view of another example embodiment of a multi-foiled depressor in accordance with various embodiments.

FIG. 9 is an oblique view illustrating an embodiment of a multi-foil depressor arm 211 that can be attached to a rotary coupling 210 using a single attachment point 900. In the embodiment shown, each of the foils 212 exhibits a V-shape design, and six such foils are attached to arm 211. In other embodiments, a different number of foils may be used, and the foils may have different shapes.

Figure 10:
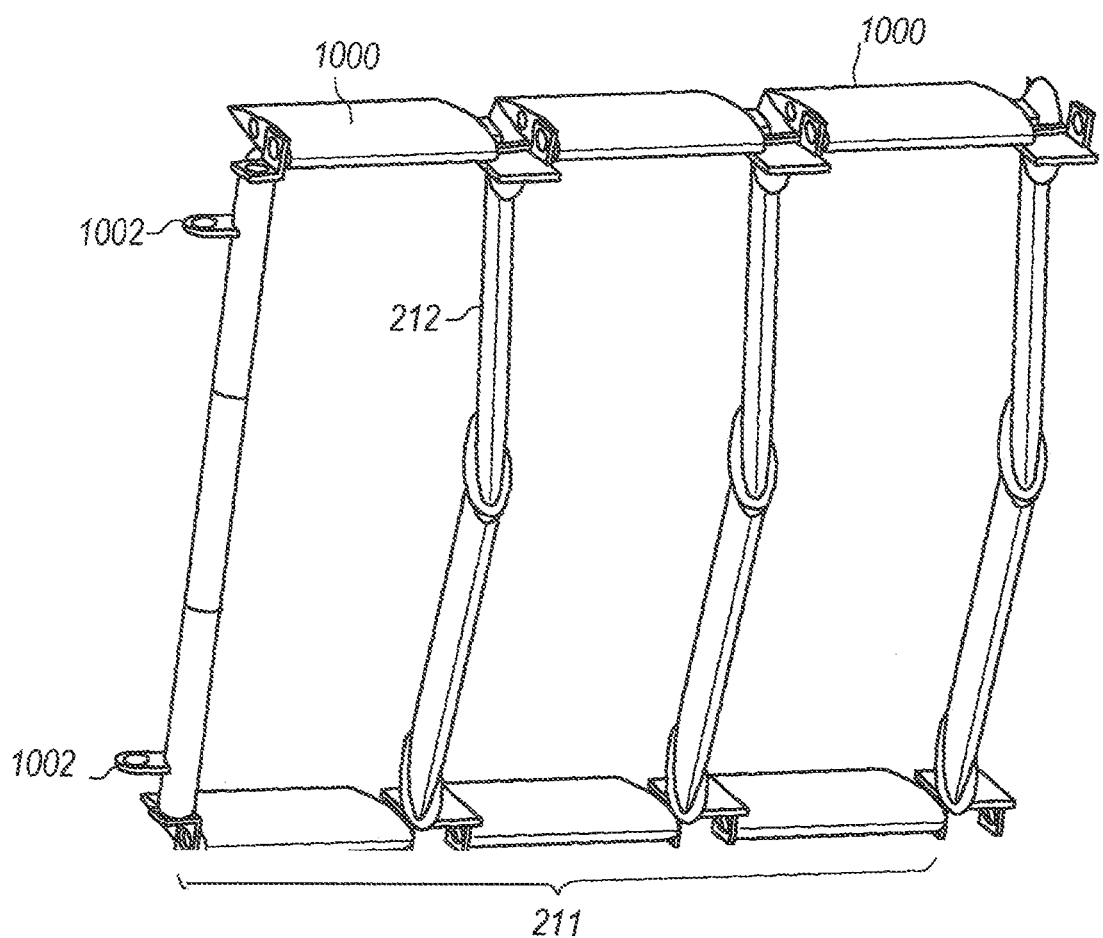
FIG. 10 illustrates an oblique view of a further example embodiment of a multi-foiled depressor in accordance with various embodiments.
Figure 11A:
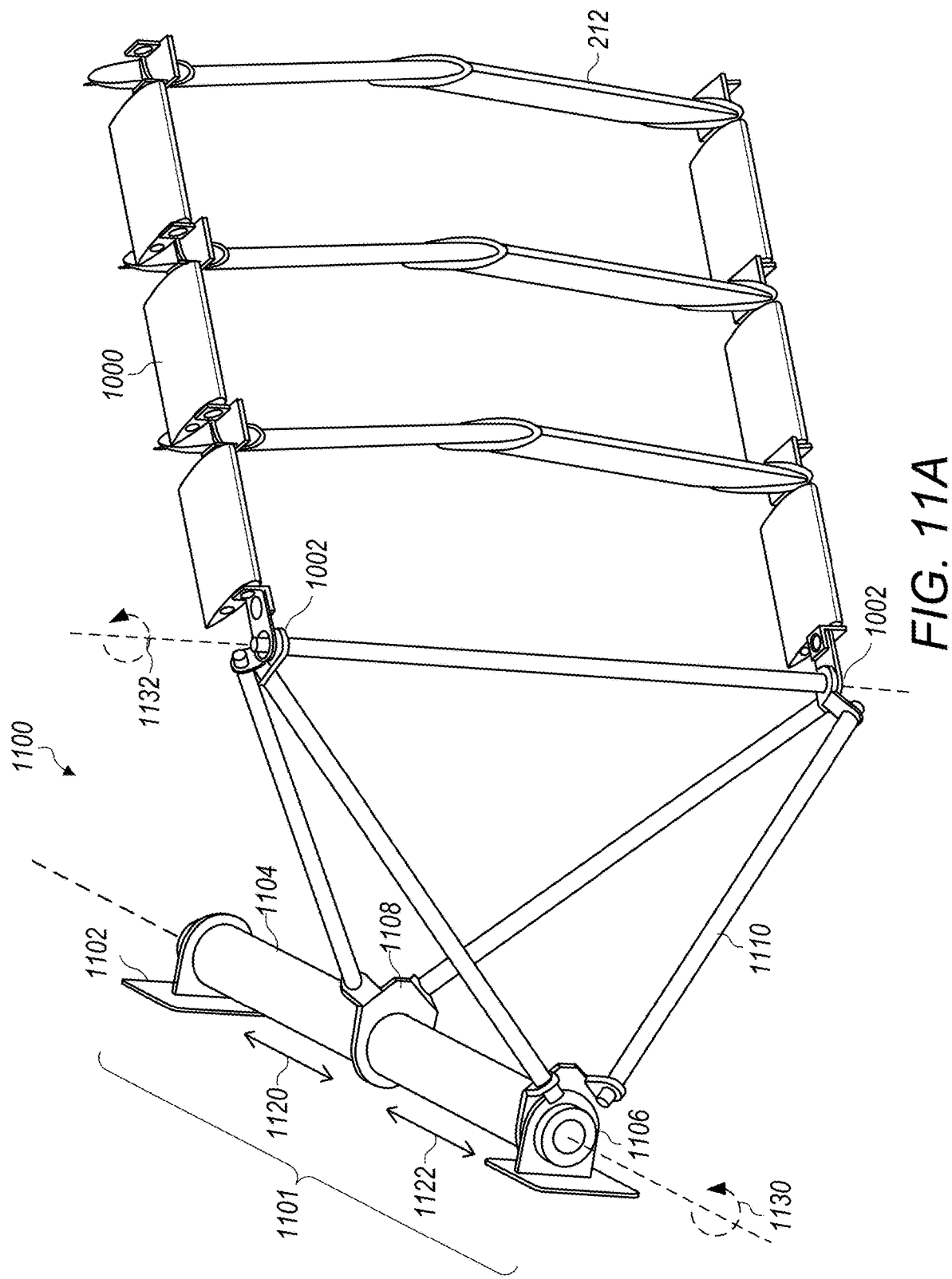
FIGS. 11A-D illustrate various views of an example multi-foiled depressor with an adjustable mounting mechanism in accordance with various embodiments.
Figure 11B:
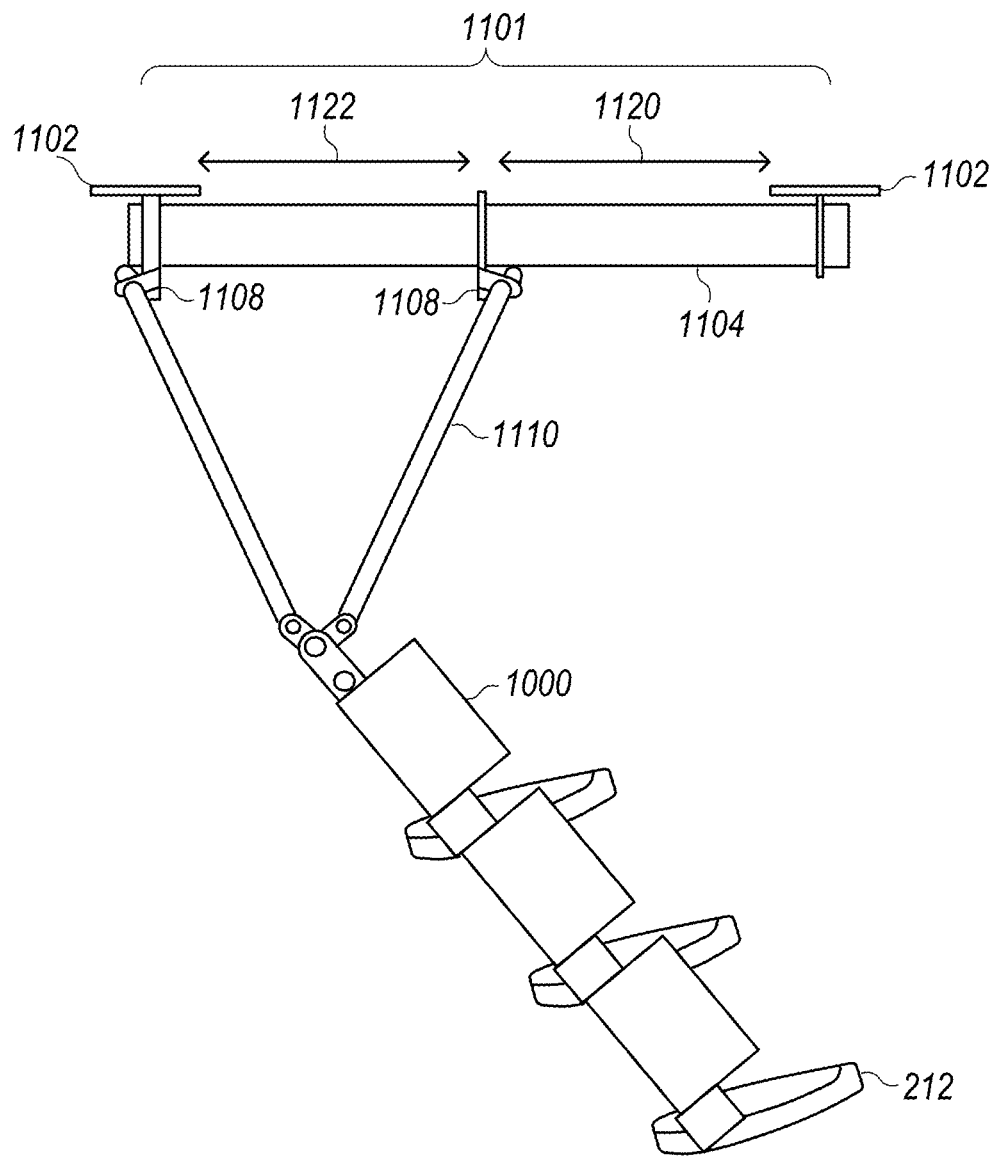
Figure 11C:
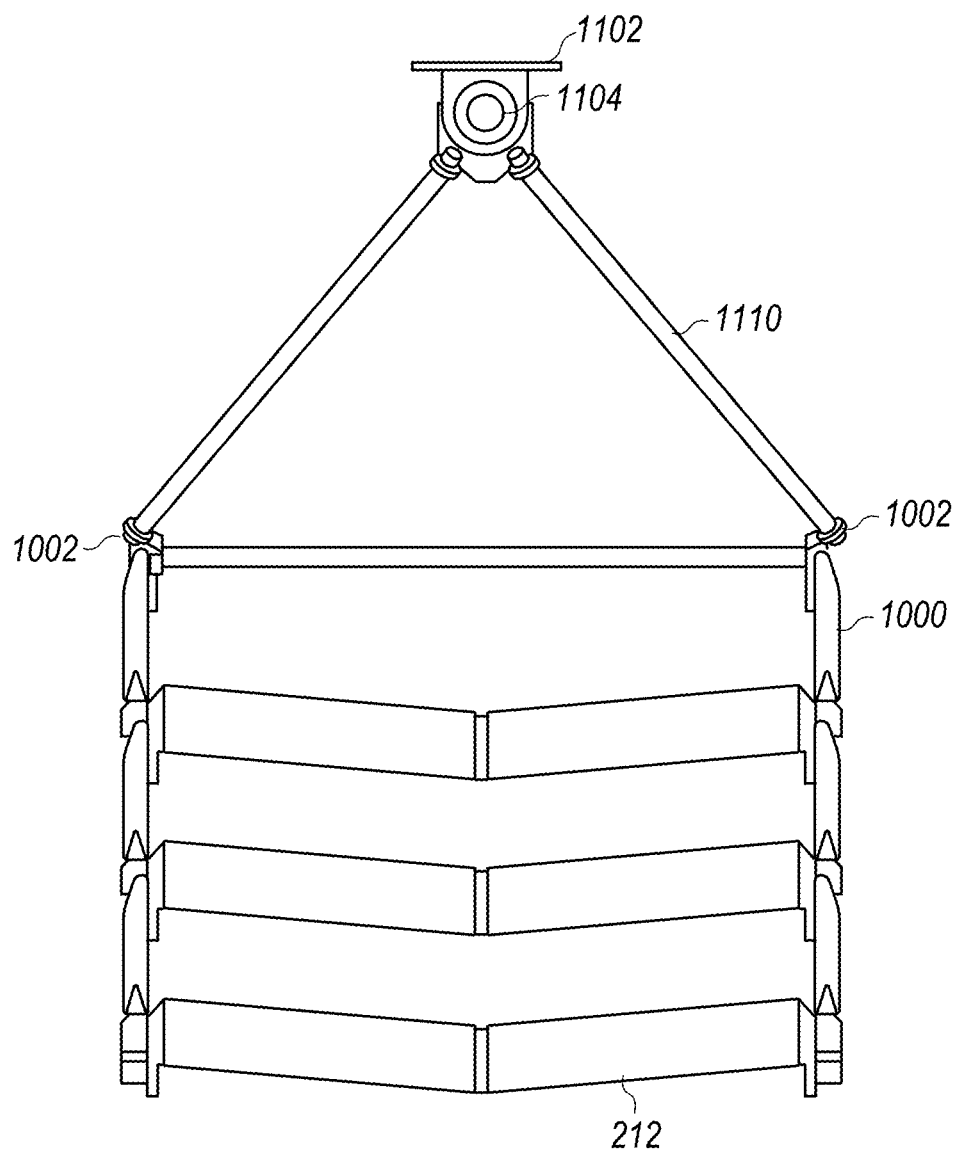
Figure 11D:
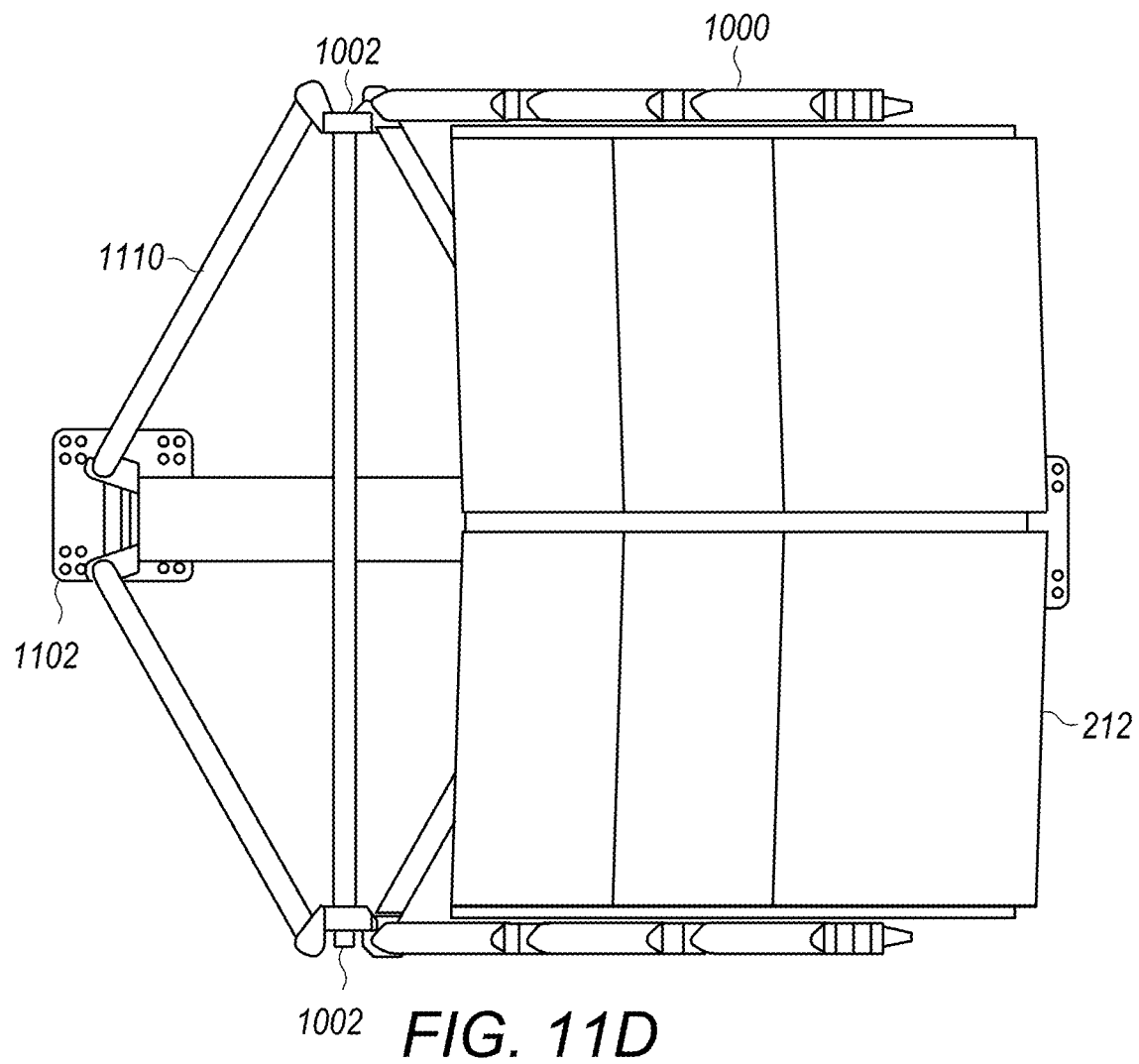

FIG. 10 is an oblique view illustrating an embodiment of a multi-foil depressor arm 211 that can be attached to a rotary coupling 210 with dual attachment points 1002 as shown. The embodiment shown in FIG. 10 also illustrates that portions of arm 211 may themselves include foils 1000 to reduce drag or to achieve lift in a direction orthogonal to foils 212 if desired. As with foils 212, foils 1000 may be individually controlled to adjust the lift generated using arm 211 and/or to add in steering body 200.

In any of the various embodiments discussed herein, the depressor arms 211 may have telescopic, foldable or winch-able components in order to make the arms shorter, smaller, or easier to handle and store. For example, FIGS. 11A and 11B-D are oblique and orthogonal views, respectively, of the depressor arm of FIG. 10 attached to a foldable, multi-axis, rotatable coupling structure 1100. Coupling structure 1100 exhibits two axes of rotation at 1130 and 1132. Depressor arm 211 is attached to structure 1100 at axis 1132 as shown such that arm 211 may rotate about axis 1132, while foldable struts 1110 (and arm 211) may rotate about axis 1130 by virtue of rotating and sliding brackets 1108. One or both of brackets 1108 may slide along the longitudinal axis of tubular member 1104 and rotate about the axis 1130 of tubular member 1104. Tubular member 1104 may be attached to a body 200 with any suitable fasteners, such as mounting brackets 1102. By sliding one or more of brackets 1108 along tubular member 1104, the location of axis 1132 may be altered along the longitudinal dimension of tubular member 1104 indicated at 1101, and can be made closer to or farther away from body 200, as desired. In some embodiments, the longitudinal locations of brackets 1108 along tubular member 1104, and/or their rotational positions around tubular member 1104, may be determined manually and then fixed in a desired position. In other embodiments, the longitudinal positions and/or the rotational positions of one or more of brackets 1108 may be altered actively, such as by means of one or motors and/or a screw drive. For example, brackets 1108 might be rotated about tubular member 1104 to shift a portion of generated lift from the y axis to the z axis discussed herein, thereby enabling vertical and/or lateral displacement of body 200 relative to marine vessel 118. As used herein, the various embodiments of arms 211 and rotary coupling 210 shown and illustrated in FIGS. 11A-D, along with their corresponding structural equivalents, may be referred to as a "second means for coupling the first means to the body."

Figure 12A:
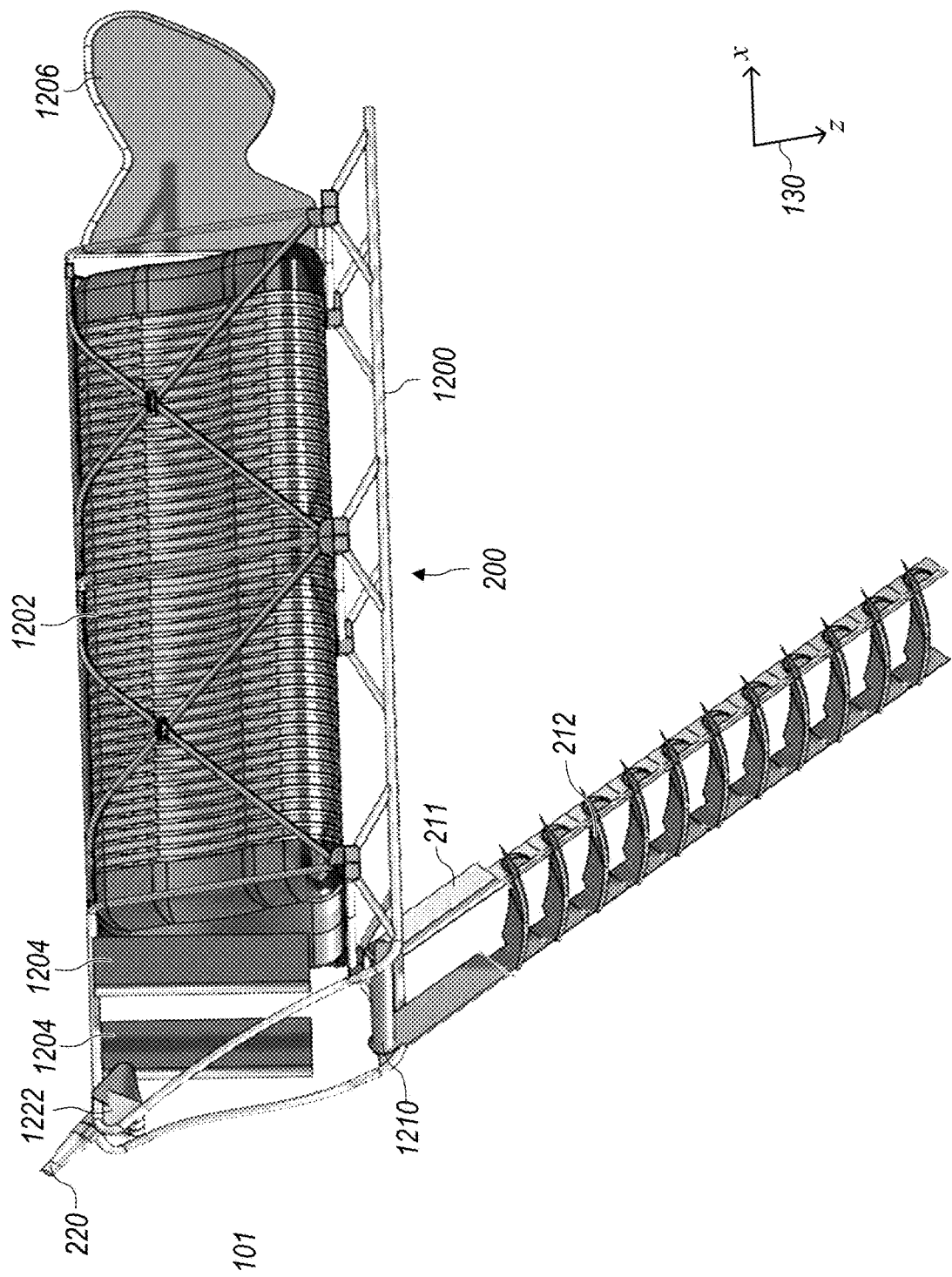
FIGS. 12A-B illustrate oblique views of another example body with a multi-foiled depressor and adjustable fins and a rudder in accordance with various embodiments.
Figure 12B:
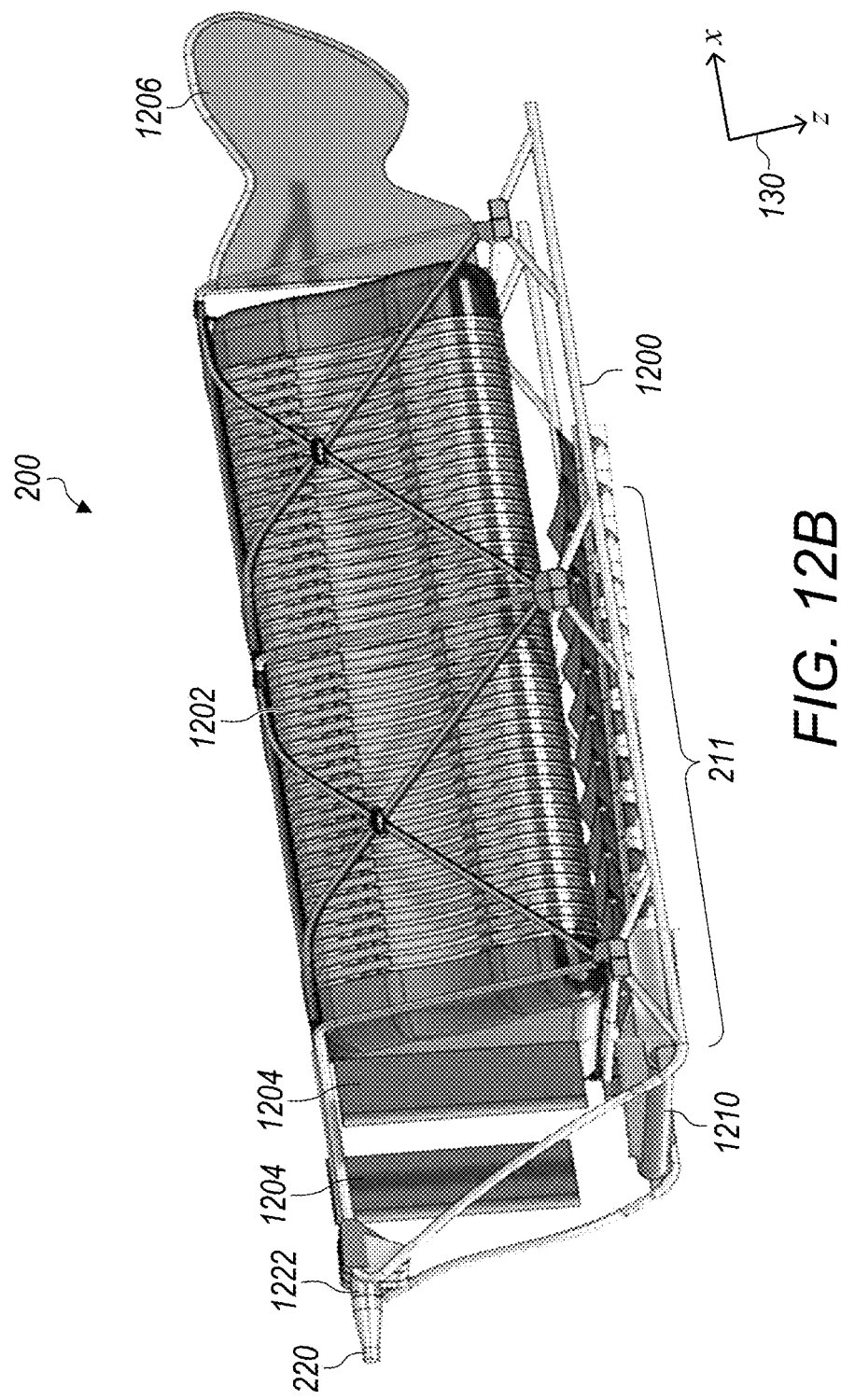

In various embodiments, body 200 may also include one or more additional fins or rudders for added control over the positioning of body 200 in the water. For example, FIGS. 12A-B are oblique views of such a body 200 with its depressor arm 211 in deployed and stowed positions, respectively. In the embodiment of FIG. 12A-B, body 200 comprises a tow sled 1200 on which is mounted a piece of marine equipment, such as a marine vibrator 1202. Depressor arm 211 is attached to sled 1200 at rotatable coupling 1210, and umbilical 220 is attached to sled 1200 at rotatable coupling 1222. Front fins 1204 are mounted near the front end of body 200, while rudder 1206 is mounted at the tail end of body 200. In various embodiments, front fins 1204 and/or rudders 1206 are configured to generate forces in addition to forces generated by foils 212 to adjust the lateral and/or vertical displacement of body 200 as discussed herein.

In the illustrated embodiment, depressor arm 211 is oriented to rotate in the xz plane 130 in order to generate force in the z or depth direction, while fins 1204 and rudder 1206 are oriented orthogonally to foils 212, such that fins 1204 and rudder 1206 generate forces in the y or lateral direction. In other embodiments, other orientations for body 200 as well as fins 1204 and rudder 1206 may be chosen. In still further embodiments, a body 200 may be equipped with one or more fins 1204 with or without a rudder 1206, or may be equipped with one or more rudders 1206 with or without fins 1204, and fins 1204 and/or rudder 1206 may be placed at other locations on body 200. When in the stowed position shown in FIG. 12B, depressor arm 211 and foils 212 may be configured to generate a small amount of lift when towed, but much less lift than when it is towed in the deployed position shown in FIG. 12A.

Additional Applications and Observations

In various embodiments discussed herein, the present disclosure includes adjusting a lateral position, a vertical position, or an inclined position of a towed body 200 by adjusting an angle of a foil 212 coupled to a rotatable arm 211 coupled to towed body 200, and/or by adjusting an angle of the rotatable arm 211 relative to the towed body. In any embodiments, a body 200 may contain marine equipment, or such equipment may be mounted to a surface of the body 200.

Cost savings may be achieved by employing embodiments to reduce drag during towing. For example, rotation of arm 211 can be unrestricted such that arm 211 is free to pivot to an angle relative to body 200 where drag and lift are balanced (in equilibrium). Body 200 can be in equilibrium during towing as a result of the one or more forces exerted by umbilical 220, 240, the foils 212, the body 200 itself, fins 1204, rudders 1206 connected to the body, or other control surfaces on body 200.

In various embodiments discussed herein, multiple bodies 200 can be coupled together with hinges, telescoping arms, or winch-able cables so that bodies 200 stack up and merge into a smaller body or a body with a smaller hydrodynamic front or rear area.

In various embodiments discussed herein, body 200 can be depressed (primarily) by tension in an arm 211 of a foiled depressor. Arm 211 can have a small cross-sectional area and still have sufficient strength (relative to moment strength) to bear the forces resulting from generated lift in various embodiments. As a result, arm 211 can have a small cross-flow area, which can reduce drag and improve the lift/drag ratio. This can enable a vessel 118 to tow a wider spread without increasing a towing force applied by the vessel 118.

Embodiments are not limited to the field of marine geophysical surveying, but rather may be employed beneficially in other contexts involving towed marine equipment as well. In the field of marine geophysical survey, however, embodiments may yield particularly notable benefits. For example, in the context of marine geophysical surveying, body 200 may include components of geophysical operation such as one or more sources, one or more receivers (e.g., geophysical sensors), a power supply, and/or navigation, control or communications equipment, or connections thereto.

Towed bodies according the present disclosure may help to increase coverage of the seismic survey, or to increase the area that can be surveyed by a single vessel, by increasing a spread of bodies 200 and/or by better controlling the depth of bodies 200 towed behind a marine survey vessel such as vessel 118. This, in turn, may increase the productivity from running a single vessel and may provide economic benefits, as the cost of adding more equipment to a vessel may be less than the cost of adding vessels to a survey. Larger coverage can provide both faster seismic surveys and better-quality seismic data.

In various embodiments discussed herein, various bodies 200 can be used to conduct a fan-style geophysical survey with sources arranged in a fan shape in either or both of the vertical or crossline planes, while simultaneously providing for: individual deployment/retrieval of sources, reduced risk of tangling or of left/right shift during operation, source steering so as to reduce delays normally associated with run-ins after line changes, and providing more flexibility regarding when and where to perform necessary maintenance operations on towed devices (e.g., service, speedy exchange, etc.). Embodiments may provide freedom of depth and lateral positions for towed equipment.

In various embodiments discussed herein, various features enable active steering of towed geophysical equipment, and steering through turns, such that adjustments to the position of towed bodies 200 can be made based on the environment, or based on changing conditions or changing survey parameters. Depth and lateral control of towed bodies 200 provided by foiled depressor arms 211 can be used for corrections to speed, waves, etc. in various instances. At least one embodiment of the present disclosure can enable smaller volume of equipment to be stored and deployed from a marine survey vessel 118 (e.g., fewer bodies 200 because spread is increased as discussed above, fewer replacement parts because the free range of rotation of arm 211 mitigates forces that might otherwise damage arm 211, etc.). At least one embodiment of the present disclosure can provide a volume of equipment better suited for a towed body 200 to improve its ease of deployment, retrieval, lifting, packing, storing, and/or shipping.

In some of the embodiments discussed herein, towed body 200 is not coupled to the surface, which removes the drag, tangling risk, handling, deck operation time, and risk associated with vertical tow lines, floats and horizontal tow lines that would otherwise be used to couple the towed body to the surface. In various embodiments discussed herein, a body 200 with arm 211 and foils 212 can enable a combination of a varying depth with varying lateral offset. The variation of depth can be made according to reflection, seafloor, geophysical, or survey objectives. The variation of lateral offset can be made according to objectives such as coverage or efficiency. In various embodiments discussed herein, towed bodies 200 can be steered away from objects floating in the sea, both at the sea surface and below. Indeed, foiled depressors 211 according to embodiments may be used to cause an entire towed seismic spread to avoid objects in the water. Using embodiments, seismic sensors can be positioned deeper, where there is reduced acoustic noise from water surface and objects on the water surface, reduced effects of waves, reduced effects of towing vessel motion and tug noise, and reduced pickup and transmission of noise from other components that can be eliminated as described hereinabove (e.g., tow lines, floats, etc.).

In various embodiments discussed herein, inherent vertical and roll stability of the towed body 200 is provided without actively moving parts. Moreover, in various embodiments, a body 200 can include a combination of a source with a receiver. In such embodiments, drag can be reduced and efficiency can be increased because there is less weight to deploy and retrieve, or less volume to store and ship because fewer bodies 200 are put in the body of water. Accordingly, cost can be reduced and efficiency can be increased, as embodiments can eliminate the need for a wide rope and/or a paravane or tow door on marine survey vessel 118 or in the towed equipment.

Embodiments discussed herein may be used to enable sources (e.g., seismic source 126) to be located farther away from a travel path of a marine survey vessel 118. For example, sources can be located farther away vertically (in the depth direction) for improved signatures and/or different ghost reflection/amplitude amplification, and sources can be located farther away horizontally (in the crossline direction) for wider seismic coverage and more mapping points. At least one embodiment of the present disclosure can provide control over source position and steering, which can ease turning, speed changes, and weather and environment response as well as other performance improvements. Embodiments may also be employed to add flexibility to the horizontal and/or vertical positioning of, and/or the steering of, streamers 120.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a body towable behind a survey vessel in a body of water;
an arm rotatably coupled to the body such that the arm, when deployed, is free to rotate as the apparatus is towed through the body of water;
a first end stop and a second end stop, wherein the first end stop and the second end stop define a range of rotation of the arm when deployed;
a motor configured to adjust the range of rotation by adjusting a position of the first end stop; and
a plurality of foils disposed on the arm and configured to generate lift as the apparatus is towed through the body of water.

2. The apparatus of claim 1, wherein the first end stop includes a first bracket, the second end stop includes a second bracket, one or more of the first bracket and the second bracket are configured to slide along a longitudinal axis of the body, and a distance between the first bracket and the second bracket defines the range of rotation of the arm when deployed.

3. The apparatus of claim 1, wherein the body is configured such that:
when the first end stop is disposed at a first position, the arm is in a stowed state;
when the first end stop is disposed at a second position, the arm is in a first deployed state in which a position of the arm relative to the body defines a first angle; and
when the first end stop is disposed at a third position, the arm is in a second deployed state in which the position of the arm relative to the body defines a second, different angle.

4. The apparatus of claim 1, wherein the apparatus is configured such that, when it is towed, at least a portion of the lift is directed along a y axis.

5. The apparatus of claim 1, wherein:
the arm is rotatably coupled to the body by a rotary coupling; and
the motor is configured to adjust the position of the first end stop by rotating a plate about the rotary coupling.

6. The apparatus of claim 1, wherein the motor is configured to adjust the position of the first end stop by inserting or moving a pin.

7. The apparatus of claim 1, wherein the motor is configured to adjust the position of the first end stop by moving the first end stop along a longitudinal axis of the body.

8. A method, comprising:
towing an apparatus behind a vessel in a body of water, wherein the apparatus includes a body and an arm having a plurality of foils disposed on the arm, and the towing is performed with the arm in an undeployed position;
controlling the apparatus to deploy the arm to a deployed position in which the arm is free to rotate and the plurality of foils generate lift as the apparatus is towed through the body of water; and
towing the apparatus behind the vessel with the arm in the deployed position;
wherein the apparatus further includes a first end stop and a second end stop, the first end stop and the second end stop define a range of rotation of the arm when deployed, and controlling the apparatus to deploy the arm to a deployed position includes adjusting a position of the first end stop.

9. The method of claim 8, wherein a portion of the lift is directed along a y axis.

10. The method of claim 9, wherein a portion of the lift is directed away from the surface of the body of water along a vertical axis.

11. The method of claim 8, wherein a portion of the body floats during the towing.

12. The method of claim 8, wherein the body and arm are completely submerged during the towing.

13. The method of claim 8, further comprising:
controlling the apparatus to deploy the arm from the deployed position to a second deployed position in which the arm is free to rotate and the plurality of foils generate lift as the apparatus is towed through the body of water, wherein a position of the arm relative to the body defines an angle that changes as the arm is deployed from the deployed position to the second deployed position; and
towing the apparatus behind the vessel with the arm in the second deployed position.

14. The method of claim 8, wherein controlling the apparatus to deploy the arm to a deployed position includes adjusting an angle of attack of the plurality of foils to cause the arm to move into the deployed position.

15. An apparatus, comprising:
a body towable behind a survey vessel in a body of water;
an arm rotatably coupled to the body such that the arm, when deployed, is free to rotate as the apparatus is towed through the body of water;
a first end stop and a second end stop, wherein the first end stop includes a first bracket and the second end stop includes a second bracket, wherein one or more of the first bracket and the second bracket are configured to slide along a longitudinal axis of the body, and wherein a distance between the first bracket and the second bracket defines a range of rotation of the arm when deployed; and
a plurality of foils disposed on the arm and configured to generate lift as the apparatus is towed through the body of water.

16. The apparatus of claim 15, further comprising:
a motor configured to adjust the range of rotation by adjusting a position of the first end stop.

17. The apparatus of claim 15, wherein:
the body includes a tow sled on which is mounted a piece of marine equipment; and
the apparatus is configured to be completely submerged in the body of water during towing.

18. The apparatus of claim 17, wherein the piece of marine equipment comprises a marine vibrator.

19. An apparatus, comprising:
a body towable behind a survey vessel in a body of water;
an arm rotatably coupled to the body such that the arm, when deployed, is free to rotate about an axis of rotation as the apparatus is towed through the body of water; and
a plurality of foils disposed on the arm and configured to generate lift as the apparatus is towed through the body of water;
wherein a longitudinal member is coupled to the body, first and second attachment members couple the arm to the longitudinal member, and a position of the second attachment member along the longitudinal member is configured to be adjustable such that the position of the second attachment member along the longitudinal member adjusts a distance between the axis of rotation and the body.

20. An apparatus, comprising:
a body towable behind a survey vessel in a body of water;
an arm rotatably coupled to the body such that the arm, when deployed, is free to rotate as the apparatus is towed through the body of water;
a plurality of foils disposed on the arm and configured to generate lift as the apparatus is towed through the body of water; and
one or more motors configured to alter the angle of attack of one or more of the plurality of foils.

21. The apparatus of claim 20, wherein the apparatus is configured such that, when it is towed, at least a portion of the lift is directed along a y axis.

22. An apparatus, comprising:
a first body towable behind a survey vessel in a body of water;
an arm rotatably coupled to the first body such that the arm, when deployed, is free to rotate as the apparatus is towed through the body of water;
a plurality of foils disposed on the arm and configured to generate lift as the apparatus is towed through the body of water;
a float coupled to the first body; and
a second body coupled to the first body and configured to be submerged in the body of water during towing, wherein the second body includes one or more seismic sources.

23. The apparatus of claim 22, wherein the apparatus is configured such that, when towed, at least a portion of the lift is directed along a y axis.

\* \* \* \* \*